(12) United States Patent
Lim et al.

(10) Patent No.: US 12,556,332 B2
(45) Date of Patent: Feb. 17, 2026

(54) METHOD AND APPARATUS FOR REPORTING CHANNEL STATE IN WIRELESS COMMUNICATION SYSTEM

(71) Applicant: Samsung Electronics Co., Ltd., Suwon-si (KR)

(72) Inventors: Yeongeun Lim, Suwon-si (KR); Hyoungju Ji, Suwon-si (KR); Youngrok Jang, Suwon-si (KR); Jinhyun Park, Suwon-si (KR); Seongmok Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 17/998,106

(22) PCT Filed: Apr. 28, 2021

(86) PCT No.: PCT/KR2021/005393
§ 371 (c)(1),
(2) Date: Nov. 7, 2022

(87) PCT Pub. No.: WO2021/225325
PCT Pub. Date: Nov. 11, 2021

(65) Prior Publication Data
US 2023/0299914 A1    Sep. 21, 2023

(30) Foreign Application Priority Data

May 6, 2020    (KR) ........................ 10-2020-0054062

(51) Int. Cl.
*H04L 5/00* (2006.01)
*H04B 7/06* (2006.01)
(52) U.S. Cl.
CPC ......... *H04L 5/0051* (2013.01); *H04B 7/0626* (2013.01); *H04B 7/0639* (2013.01)

(58) Field of Classification Search
CPC ... H04L 5/0051; H04B 7/2626; H04B 7/0639; H04B 7/0456; H04B 7/0478; H04B 7/0658
See application file for complete search history.

(56) References Cited

U.S. PATENT DOCUMENTS

2011/0319027 A1\* 12/2011 Sayana ............... H04B 7/0632
455/67.11
2018/0145737 A1    5/2018 Rahman et al.
(Continued)

FOREIGN PATENT DOCUMENTS

CN          110832789 A     2/2020
KR    10-2018-0135851 A    12/2018
(Continued)

OTHER PUBLICATIONS

Communication dated Sep. 5, 2023, in connection with European Application No. 21800186.5, 9 pages.
(Continued)

*Primary Examiner* — Jeffrey M Rutkowski

(57) ABSTRACT

Disclosed are a method and apparatus for reporting a channel state of a user equipment in a wireless communication system. The method may comprise the steps of: receiving, from a base station, configuration information for measurement and reporting of a channel state, wherein the configuration information includes at least two from among a first value (L) indicating the number of beams to be reported via a precoding matrix indicator (PMI), a second value ($P_{CSI-RS}$) indicating the number of ports of a channel state information reference signal (CSI-RS), and a third value ($L_{CSI-RS}$) indicating the number of beam ports to be used from among the number of ports of the CSI-RS; receiving, from the base station, one or more CSI-RSs that are transmitted via one or more beamformed ports; generating the PMI, on the basis of
(Continued)

the result of measuring the received CSI-RSs, and the configuration information; and reporting, to the base station, CSI including the PMI.

16 Claims, 15 Drawing Sheets

(56) References Cited

U.S. PATENT DOCUMENTS

| | | | |
|---|---|---|---|
| 2018/0278315 | A1 | 9/2018 | Wu et al. |
| 2018/0279293 | A1 | 9/2018 | Harrison et al. |
| 2019/0342768 | A1 | 11/2019 | Xu et al. |
| 2020/0083938 | A1 | 3/2020 | Park et al. |
| 2021/0050895 | A1 | 2/2021 | Kang et al. |
| 2021/0167835 | A1 | 6/2021 | Wang et al. |
| 2021/0242914 | A1 | 8/2021 | Park et al. |
| 2022/0078649 | A1* | 3/2022 | Chen ............... H04L 5/0057 |
| 2024/0223254 | A1* | 7/2024 | Hindy ............... H04B 7/0482 |

FOREIGN PATENT DOCUMENTS

| | | |
|---|---|---|
| KR | 10-2019-0040239 A | 4/2019 |
| KR | 10-2019-0089933 A | 7/2019 |
| WO | 2020022856 A1 | 1/2020 |
| WO | 2020/029937 A1 | 2/2020 |

OTHER PUBLICATIONS

3GPP TS 38.214 V15.0.1 (Feb. 2018), Technical Specification, 3rd Generation Partnership Project; Technical Specification Group Radio Access Network; NR; Physical layer procedures for data (Release 15), Feb. 2018, 73 pages.

Notification of the Second Office Action dated Oct. 17, 2024, in connection with Chinese Application No. 202180033709.X, 10 pages.

International Search Report dated Aug. 18, 2021, in connection with International Application No. PCT/KR2021/005393, 2 pages.

Written Opinion of the International Searching Authority dated Aug. 18, 2021, in connection with International Application No. PCT/KR2021/005393, 7 pages.

Request for the Submission of an Opinion dated Apr. 22, 2025, in connection with Korean application No. 10-2020-0054062, 11 pages.

ZTE, "CSI Enhancement for MU-MIMO Support", 3GPP TSG RAN WG1 Meeting #95, R1-1813913, Nov. 2018, 11 pages.

Nokia, "Introduction of NR enhanced MIMO", 3GPP TSG-RAN WG1 Meeting #99, R1-1913203, Nov. 2019, 31 pages.

Communication pursuant to Article 94(3) EPC dated Jul. 29, 2025, in connection with European Application No. 21800186.5, 8 pages.

\* cited by examiner

METHOD AND APPARATUS FOR REPORTING CHANNEL STATE IN WIRELESS COMMUNICATION SYSTEM

CROSS-REFERENCE TO RELATED APPLICATIONS

This application is a 371 of International Application No. PCT/KR2021/005393 filed on Apr. 28, 2021, which claims priority to Korean Patent Application No. 10-2020-0054062, filed May 6, 2020, the disclosures of which are herein incorporated by reference in their entirety.

BACKGROUND

1. Field

A method and apparatus for measuring and reporting the channel state of a user equipment (UE) in a wireless communication system are disclosed.

2. Description of Related Art

In order to meet the demand for wireless data traffic which has been increasing since commercialization of the 4th generation (4G) communication system, efforts are made to develop an enhanced 5th generation (5G) communication system or pre-5G communication system. In this context, the 5G communication system or pre-5G communication system is called the beyond 4G network communication system or post long term evolution (LTE) system. The 5G communication system defined by the 3rd generation partnership project (3GPP) is called a new radio (NR) system.

To achieve high data rates, implementation of the 5G communication system in an ultra high frequency band (mmWave) such as 60 GHz is under consideration. To mitigate pathloss in the ultra-high frequency band and increase the propagation distance of radio waves, the following techniques are taken into account for the 5G communication system: beamforming, massive multiple input multiple output (MIMO), full dimensional MIMO (FD-MIMO), array antenna, analog beamforming, and large scale antenna.

To enhance the network in the 5G communication system, various techniques are under development, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also various other techniques under development for the 5G system, including, e.g., hybrid FSK and QAM modulation (FOAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

In a kind of 5G system, NR, channel state information (CSI) generically refers to various types of indicators reported by a UE. The CSI may include a channel quality indicator (CQI), a precoding matrix indicator (PMI), a channel state information-reference signal (CSI-RS) resource indicator (CRI), a synchronization signal/physical broadcast channel (SS/PBCH) block resource indicator (SSBRI), a layer indicator (LI), a rank indicator (RI), and/or L1-referenced signal received power (L1-RSRP). One of the purposes of CSI is to recommend an appropriate precoding matrix to a base station (BS) based on estimated channel quality. From the perspective of a UE, much of CSI estimation and reporting is related to a precoding matrix.

To accurately indicate the channel state of the UE to the BS, it is necessary to properly and accurately configure CSI, particularly a PMI. However, the PMI including a very large amount of information increases uplink feedback overhead and wastes resources. Therefore, there is a need for a technique for effectively reducing feedback overhead without decreasing the efficiency of state reporting as much as possible in reporting a channel state including a PMI.

SUMMARY

The disclosure relates to a method and apparatus for generating a channel state report by a user equipment (UE) in a wireless communication system.

The disclosure relates to a method and apparatus for reducing the size of a channel state report generated using an uplink reference signal in a wireless communication system.

The disclosure relates to a method and apparatus for reporting an appropriate precoding matrix index (PMI) based on estimated channel quality to a base station (BS) in a wireless communication system.

According to the disclosure, a UE may reduce the size of a channel state report and increase the quality of amplitude and phase reporting, using an uplink reference signal in a wireless communication system.

According to an embodiment of the disclosure, a method of reporting a channel state by a user equipment (UE) in a wireless communication system may include receiving configuration information for channel state measurement and reporting from a base station (BS), wherein the configuration information includes at least two of a first value L indicating the number of beams to be reported through a precoding matrix indicator (PMI), a second value PCSI-RS indicating the number of channel state information reference signal (CSI-RS) ports, or a third value LCSI-RS indicating the number of beam ports to be used among the CSI-RS ports, receiving at least one CSI-RS transmitted through at least one beamformed port from the BS, generating the PMI based on a measurement result of the received CSI-RS and the configuration information, and reporting CSI including the PMI to the BS.

According to an embodiment of the disclosure, a method of configuring a channel state report by a BS in a wireless communication system may include transmitting configuration information for channel state measurement and reporting to a UE, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, transmitting at least one CSI-RS through at least one beamformed port from the BS, and receiving CSI including the PMI generated based on a measurement result of the received CSI-RS and the configuration information from the UE.

According to an embodiment of the disclosure, an apparatus of a UE, for reporting a channel state in a wireless communication system may include a transceiver, and a processor coupled with the transceiver. The processor may be configured to receive configuration information for channel state measurement and reporting from a BS, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, receive at least one CSI-RS transmitted through at least one beamformed port from the BS, generate the PMI based on a measurement result of the received CSI-RS and the configuration information, and report CSI including the PMI to the BS.

According to an embodiment of the disclosure, an apparatus of a BS, for configuring a channel state report in a wireless communication system may include a transceiver, and a processor coupled with the transceiver. The processor may be configured to transmit configuration information for channel state measurement and reporting to a UE, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, transmit at least one CSI-RS through at least one beamformed port from the BS, and receive CSI including the PMI generated based on a measurement result of the received CSI-RS and the configuration information from the UE.

DETAILED DESCRIPTION

Figure 1:
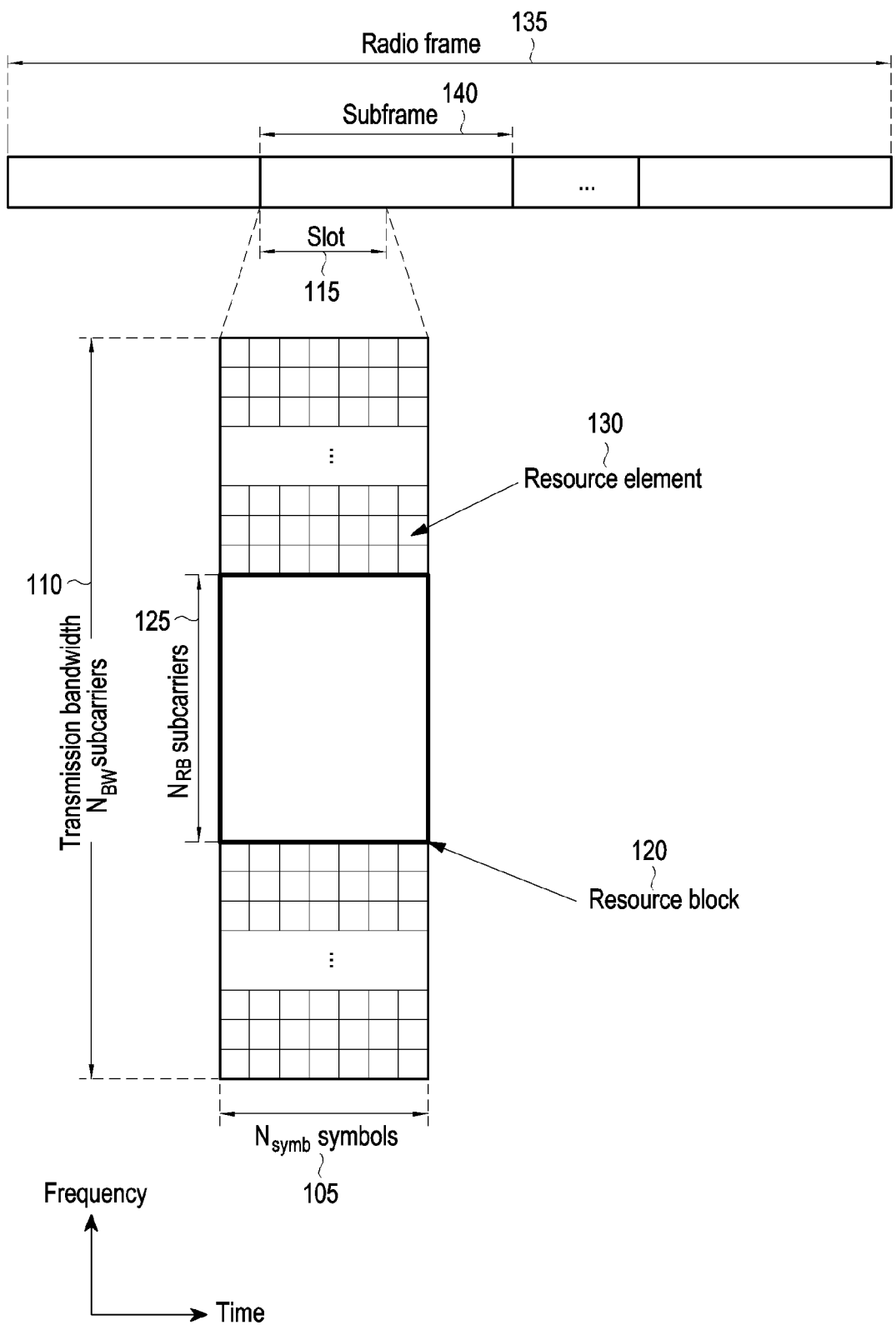
FIG. 1 is a diagram illustrating a time-frequency domain transmission structure of a wireless communication system.

Embodiments of the disclosure are described below in detail with reference to the accompanying drawings.

A detailed description of a generally known function or structure of the disclosure will be avoided lest it should obscure the subject matter of the disclosure. Although the terms as described later are defined in consideration of functions in the disclosure, the terms may be changed according to the intention of a user or an operator, or customs. Therefore, the definitions should be made, not simply by the actual terms used but by the meanings of each term lying within.

For the same reason, some components are exaggerated, omitted, or schematically illustrated in the drawings. The drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims.

It will be understood that each block of the flowchart illustrations and block diagrams, and combinations of blocks in the flowchart illustrations and/or block diagrams can be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart block(s). These computer program instructions may also be stored in a computer-usable or computer-readable memory that can direct the computer or other programmable data processing equipment to function in a particular manner, such that the instructions stored in the computer-usable or computer-readable memory produce an article of manufacture including instruction means which implement the function specified in the flowchart block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions specified in the flowchart block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit or part" as used herein means, but is not limited to, a software or hardware component, such as a field programmable gate array (FPGA) or application specific integrated circuit (ASIC), which performs certain tasks. A unit or part may advantageously be configured to reside on an addressable storage medium and configured to be executed on one or more processors. Thus, a unit or part may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processors (CPUs) in a device or a secure multimedia card.

Embodiments of the disclosure are described below in detail with reference to the accompanying drawings. A detailed description of a generally known function or structure of the disclosure will be avoided lest it should obscure the subject matter of the disclosure. Although the terms as described later are defined in consideration of functions in the disclosure, the terms may be changed according to the intention of a user or an operator, or customs. Therefore, the definitions should be made, not simply by the actual terms used but by the meanings of each term lying within. A base station (BS), which is an entity to allocate resources to a user equipment (UE), may be at least one of a next generation Node B (gNode B), a evolved Node B (eNode B), a Node B, a radio access unit, a base station controller (BSC), or a network node. Hereinbelow, a BS may be referred to as an eNB. A terminal may include a user equipment (UE), a mobile station (MS), a cellular phone, a smartphone, a computer, or a multimedia system of executing a communication function. Hereinbelow, a terminal will be referred to as a UE, not limited to the above examples.

A description will be given below of a technique for receiving broadcasting information from an eNB by a UE in the disclosure. The disclosure relates to a communication scheme for converging a 5th generation (5G) communication system for supporting a higher data rate than a beyond 4G system with Internet of things (IoT). The disclosure is applicable to intelligent services (e.g., smart home, smart building, smart city, smart car or connected car, healthcare, digital education, retail, security- and safety-related service, and so on) based on 5G communication technology and IoT-related technology.

Terms indicating broadcasting information, terms indicating control information, terms related communication coverage, terms indicating a state change (e.g., event), terms indicating network entities, terms indicating messages, terms indicating components of a device, and so on are provided by way of example, for convenience of description. Accordingly, the disclosure is not limited to the terms described below, and other terms having the same technical meanings may be used instead.

For convenience of description below, some terms and names defined in the 3rd generation partnership project (3GPP) long term evolution (LTE) standards or the 3GPP new radio (NR) standards may be used. However, the disclosure is not limited by the above terms and names, and may be equally applied to systems conforming to other standards.

Beyond the initial voice-centered service, wireless communication systems are evolving into broadband wireless communication systems that provide high-speed, high-quality packet data services, such as 3GPP communication standards including high speed packet access (HSPA), LTE or evolved universal terrestrial radio access (E-UTRA), and LTE-advanced (LTE-A), and LTE-Pro, and 3GPP2 standards including high rate packet data (HRPD), ultra mobile broadband (UMB), and IEEE 802.16e.

A representative example of the broadband wireless communication systems, LTE adopts orthogonal frequency division multiplexing (OFDM) for downlink (DL), and single carrier frequency division multiple access (SC-FDMA) for uplink (UL). UL refers to a radio link in which a UE transmits data or control signals to an eNB, and DL refers to a radio link in which the eNB transmits data or control signals to the UE. In the above multiple access schemes, data or control information of each user is identified by allocating and operating time-frequency resources to carry the data or the control information in such a manner that they do not overlap, that is, orthogonality is established.

The post LTE communication system, that is, the 5G communication system should be able to freely reflect various requirements of users and service providers, and thus support services satisfying various requirements. Services considered for the 5G communication system include enhanced mobile broadband (eMBB), massive machine type communication (mMTC), ultra reliability low latency communication (URLLC), and so on.

According to an embodiment, eMBB aims to provide a higher data transmission rate than the data transmission rate supported by legacy LTE, LTE-A, or LTE-Pro. For example, MBB should be able to provide up to 20 Gbps on DL and up to 10 Gbps on UL from the viewpoint of one eNB in the 5G communication system. An increased user perceived data rate should also be provided. To satisfy this requirement, transmission/reception techniques need improvement, including advanced multiple input multiple output (MIMO) transmission technology. In addition, use of a wider frequency bandwidth than 20 MHz used in current LTE in a frequency band at 3 to 6 GHz or above 6 GHz may satisfy the data transmission rate required for the 5G communication system.

In the 5G communication system, mMTC is considered to support application services such as Internet of things (IoT). In order to efficiently provide IoT, mMTC may require massive UE access support, improved UE coverage, an improved battery life, and reduced UE cost in a cell. Since IoT provides a communication function through attachment to various sensors and various devices, IoT should be able to support a large number of UEs (e.g., 1,000,000 UEs/km2) within a cell. In addition, since a UE supporting mMTC is highly likely to be located in a shaded area that the cell does not cover such as the basement of a building in view of the nature of the service, it may require wider coverage compared to other services provided by the 5G communication system. The UE supporting mMTC should be configured as a low-cost UE, and since it is difficult to frequently exchange the battery of the UE, a very long battery life time may be required.

URLLC, which is a cellular-based wireless communication service serving a specific (mission-critical) purpose, is used for remote control of a robot or a machine, industrial automation, unmanned aerial vehicles, remote healthcare, emergency alert, and so on, and should provide ultra-low latency and ultra-reliability communication. For example, a service supporting URLLC should satisfy an air interface latency less than 0.5 ms and has a requirement of a packet error rate of 10-5 or less. Therefore, for a service supporting URLLC, the 5G system should provide a smaller transmit time interval (TTI) than other services, and has a design requirement of allocation of wide resources in a frequency band. However, mMTC, URLLC, and eMBB are only examples of different service types, not limiting service types to which the disclosure is applied.

The above-described services considered in the 5G communication system should be provided through convergence based on one framework. That is, for efficient resource management and control, it is preferable that the services are integrally controlled and transmitted in a single system, rather than independently.

While embodiments of the disclosure are described below in the context of the LTE, LTE-A, LTE Pro, or NR system, by way of example, the embodiment of the disclosure may be applied to other communication systems having a similar technical background or channel type. In addition, the embodiments of the disclosure may be applied to other communication systems with some modifications made within a range that does not significantly depart from the scope of the disclosure as judged by those skilled in the art. Frame structures of the LTE, LTE-A, and 5G systems will be described below with reference to the drawings, and a design direction of the 5G system will be described.

FIG. 1 is a diagram illustrating a time-frequency domain transmission structure in an LTE-based wireless communication system.

A basic structure of a wireless resource area in which data or a control channel is transmitted in the time-frequency domain in the LTE, LTE-A, and NR systems based on cyclic prefix (CP) OFDM (CP-OFDM) or SC-FDMA waveforms is illustrated. In the illustrated basic structure, the horizontal axis represents time, and the vertical axis represents frequency. UL may refer to a radio link in which a UE transmits data or a control signal to an eNB, and DL refers to a radio link in which an eNB transmits data or a control signal to a UE.

Referring to FIG. 1, a minimum transmission unit in the time domain is an OFDM symbol or an SC-FDMA symbol, and one slot 115 may include Nsymb symbols 105. In LTE and LTE-A, one subframe 140 may include two slots each including 7 symbols 105 (Nsymb=7). According to an embodiment, 5G may support two types of scheduling, that is, slot-based scheduling and mini-slot-based scheduling (or non-slot-based scheduling). For a 5G slot, Nsymb may have a value of 7 or 14, and for a 5G mini-slot, Nsymb may be configured as one of 1, 2, 3, 4, 5, 6, and 7. In LTE and LTE-A, the length of a slot is 0.5 ms, and the length of a subframe is fixed to 1.0 ms, whereas in the NR system, the length of a slot or mini-slot is flexibly variable according to a subcarrier spacing.

In LTE and LTE-A, a radio frame 135 is a time-domain unit including 10 subframes. In LTE and LTE-A, a minimum transmission unit in the frequency domain is a subcarrier of 15 kHz (that is, subcarrier spacing=15 kHz), and a transmission bandwidth 110 of an entire system transmission band includes a total of NBW subcarriers. The flexible scalable frame structure of the NR system will be described later.

A basic resource unit in the time-frequency domain is a resource element (RE) 130, which may be represented by an OFDM or SC-FDMA symbol index and a subcarrier index. A resource block (RB) (or physical resource block (PRB)) 120 may be defined as Nsymb consecutive OFDM or SC-FDMA symbols 105 in the time domain by NRB consecutive subcarriers 125 in the frequency domain. Accordingly, one RB 120 includes Nsymb×NRB REs 130. In the LTE and LTE-A systems, data is mapped to time-frequency resources on an RB basis, and the eNB performs scheduling for the UE in units of an RB pair in one subframe. The number Nsymb of SC-FDMA or OFDM symbols 105 is determined according to the length of a CP added to each symbol to prevent inter-symbol interference. For example, Nsymb=7 in a normal CP case, and Nsymb=6 in an extended CP case. The extended CP may be applied to a system having a relatively larger radio transmission distance than the normal CP in order to maintain inter-symbol orthogonality.

A subcarrier spacing, a CP length, and so on are essential information for OFDM transmission and reception, and should be known commonly to the eNB and the UE, for active transmission and reception.

The frame structures of the LTE and LTE-A systems as described above are designed in consideration of typical voice/data communication, and have limitations in terms of scalability in satisfying various services and requirements like the NR system. Therefore, the NR system needs to flexibly define and operate a frame structure in consideration of various services and requirements.

Figure 2:
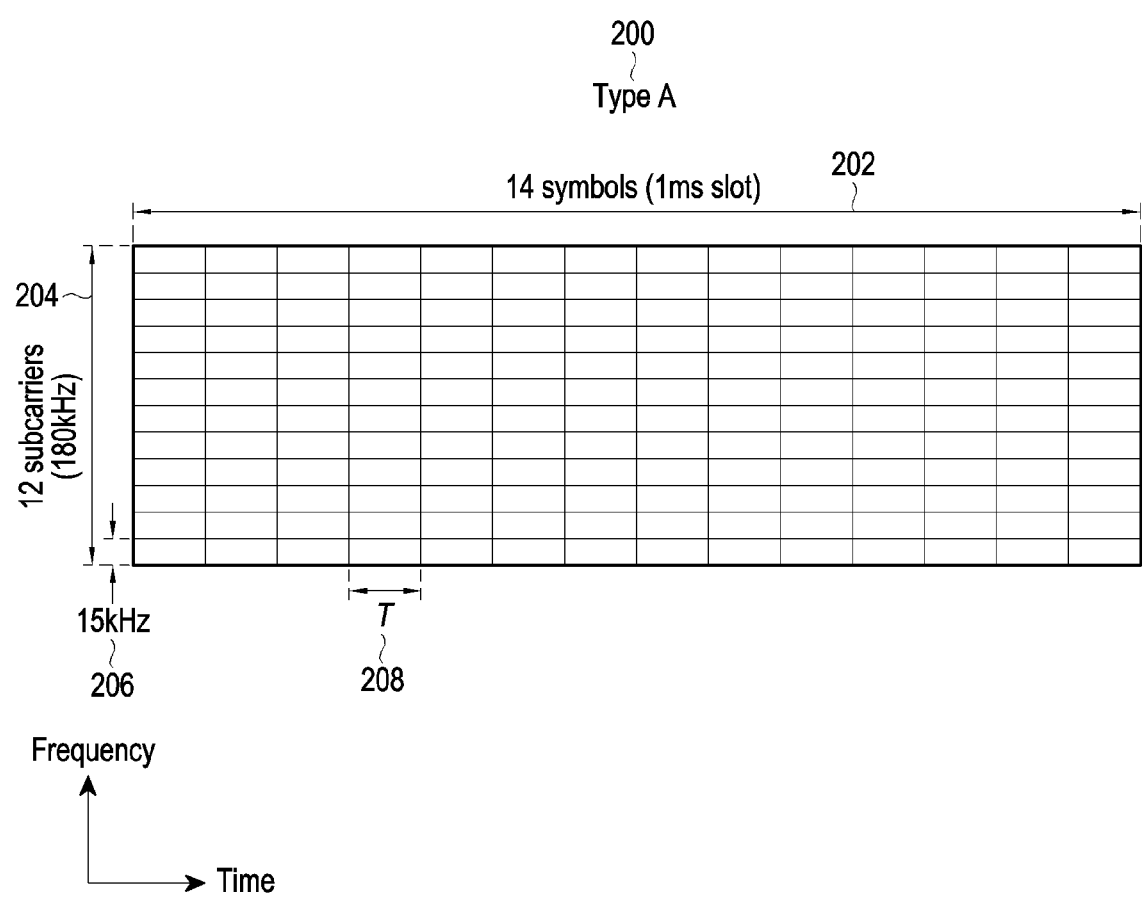
FIGS. 2 to 4 illustrate exemplary extended frame structures in a new radio (NR) communication system.
Figure 3:
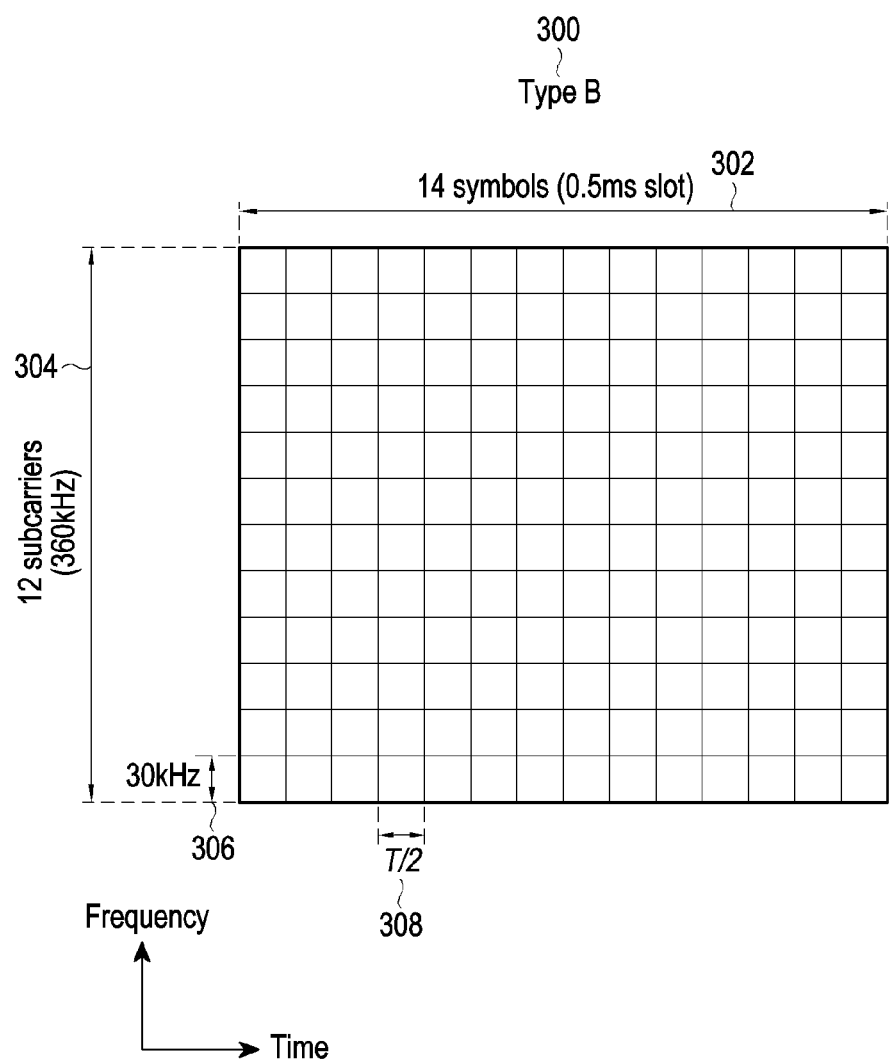
Figure 4:
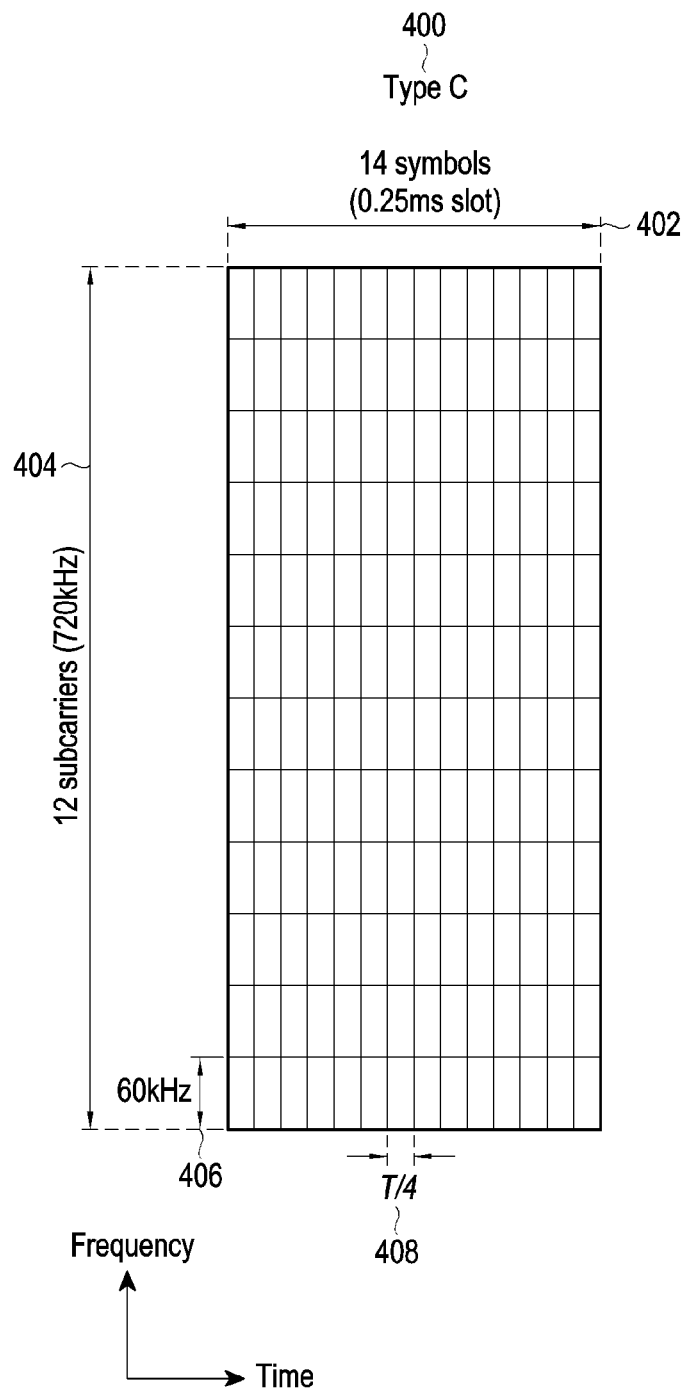

FIGS. 2 to 4 are diagrams illustrating extended frame structures in an NR communication system.

In the illustrated examples of FIGS. 2 to 4, an essential parameter set that defines an extended frame structure may include at least one of a subcarrier spacing, a CP length, or a slot length. At least coexistence with the legacy LTE/LTE-A system or a dual-mode operation is expected at the initial stage of introduction of the 5G system. Owing to the coexistence or the dual-mode operation, the legacy LTE/LTE-A system may provide stable system operations, and the 5G system may provide improved services. Therefore, the extended frame structure of the 5G system needs to include at least the LTE/LTE-A frame structure.

Referring to FIG. 2, a 5G frame structure identical to the LTE/LTE-A frame structure, and an essential parameter set defining the frame structure are shown. In frame structure type A 200 illustrated in FIG. 2, a subcarrier spacing 206 is 15 kHz, 14 symbols each having a length T 208 are included in a 1-ms slot 202, and 12 subcarriers (=180 kHz=12×15 kHz) 204 are included in one PRB.

Referring to FIG. 3, in frame structure type B 300, a subcarrier spacing 306 is 30 kHz, 14 symbols each having a length T/2 308 are included in a 0.5-ms slot 302, and 12 subcarriers (=360 kHz=12×30 kHz) 304 are included in one PRB. Compared to frame structure type A, the subcarrier spacing 306 and a PRB size are doubled, whereas the slot length 302 and the symbol length 308 are twice smaller.

Referring to FIG. 4, in frame structure type C 400, a subcarrier spacing 406 is 60 kHz, 14 symbols each having a length T/4 408 are included in a 0.25-ms slot 402, and 12 subcarriers (=720 kHz=12×60 kHz) 404 are included in one PRB. Compared to frame structure type A, the subcarrier spacing 406 and the PRB size are four times larger, whereas the slot length 408 and the symbol length 408 are four times smaller.

When the frame structure types 200, 300, and 400 are generalized, it is possible to provide high scalability by placing essential parameter sets such as subcarrier spacings, CP lengths, and slot lengths in an integer multiple relationship in the frame structure types. In addition, a subframe having a fixed length of 1 ms may be defined to indicate a reference time unit independent of the frame structure types 200, 300, and 400. Accordingly, one subframe includes one slot in frame structure type A 200, two slots in frame structure type B 300, and four slots in frame structure type C 400. Scalable frame structures may be applied to other subcarrier spacings such as 120 kHz and 240 kHz and have different structures, not limited to frame structure type A, B, or C described above.

According to an embodiment, the above frame structure types may be applied by mapping them to various scenarios.

In terms of a cell size, a larger cell may be supported with a larger CP length, and thus frame structure type A 200 may support a relatively large cell, compared to frame structure types B and C 300 and 400. In terms of an operating frequency band, a larger subcarrier spacing is more advantageous for phase noise recovery in a high frequency band, and thus frame structure type C 400 may support a relatively high operating frequency, compared to frame structure types A and B 200 and 300. In terms of a service, a smaller subframe length is more advantageous in supporting an ultra-low latency service such as URLLC, and thus frame structure type C 400 is relatively suitable for the URLLC service, compared to frame structure types A and B 200 and 300.

According to an embodiment, a plurality of frame structure types may be multiplexed and integrally operated in one system.

In NR, one component carrier (CC) (corresponding to a serving cell) may include up to 250 RBs. Therefore, when the UE always receives an entire serving cell bandwidth (a serving cell bandwidth) as in LTE, the power consumption of the UE may be extremely large, and to solve this problem, the eNB may configure one or more bandwidth parts (BWPs) within a transmission bandwidth for the UE to support the UE to change a reception area in the cell. In an embodiment, in NR, the eNB may configure the UE with an "initial BWP" which is the bandwidth of control resource set (CORESET) #0 (or a common search space (CSS)) through a master information block (MIB) or a system information block (SIB). The initial BWP is used to receive an SIB or random access (RA)-related information, or is used in an idle state. Subsequently, the eNB may configure a first BWP for the UE by radio resource control (RRC) signaling, and then notify the UE of at least one or more pieces of BWP configuration information by downlink control information (DCI). The eNB may indicate a band to be used by the UE by indicating a BWP ID in the DCI. When the UE fails to receive DCI in a currently allocated BWP during a specific time or longer, the UE may return to a "default BWP" indicated by RRC signaling and attempt to receive DCI.

Figure 5:
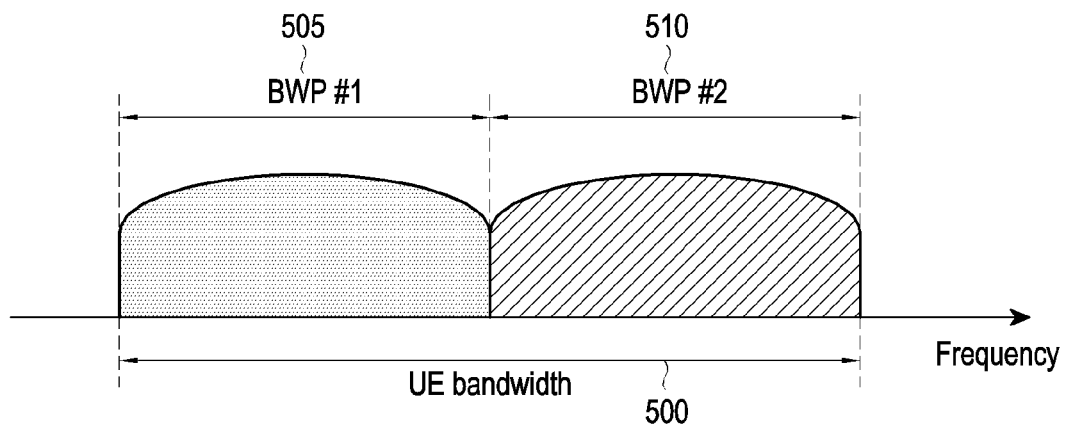
FIG. 5 is a diagram illustrating an exemplary bandwidth part (BWP) configuration in an NR communication system.

FIG. 5 is a diagram illustrating an exemplary BWP configuration in an NR communication system.

Referring to FIG. 5, a UE bandwidth 500 may be configured with two BWPs, that is, BWP #1 505 and BWP #2 510. The eNB may configure one or more BWPS for the UE, and at least one piece of the following information described in <Table 1> below may be configured for each BWP.

TABLE 1

Configuration information 1: the bandwidth of the BWP (the number of RBs included in the BWP)
Configuration information 2: the frequency position of the BWP (an offset value from a reference point. The reference point may be, for example, a center frequency of a carrier, a synchronization signal, a synchronization signal raster, or the like).
Configuration information 3: the numerology (e.g., a subcarrier spacing, a CP length, and so on) of the BWP
Others In addition to the configuration information in <Table 1>, various parameters related to the BWP may be configured for the UE. Configuration information that may include the various parameters may be transmitted to the UE by higher layer signaling, for example, RRC signaling from the eNB. At least one of one or more configured BWPs may be activated. Activation of a configured BWP may be indicated to the UE by the eNB, semi-statically by RRC signaling or dynamically by a medium access control (MAC) control element (CE) or DCI.

A BWP configuration supported by the 5G communication system may be used for various purposes.

For example, when a bandwidth supported by the UE is smaller than a system bandwidth, the bandwidth may be supported by a BWP configuration. For example, the UE may be allowed to transmit and receive data at a specific frequency position in the system bandwidth by configuring the frequency position (configuration information 2) of a BWP for the UE in <Table 1>.

In another example, the eNB may configure a plurality of BWPs for the UE to support different numerologies. For example, to support data transmission and reception using both subcarrier spacings of 15 kHz and 30 kHz for the UE, two BWPs may be configured to use the subcarrier spacings of 15 kHz and 30 kHz, respectively. Different BWPs may be multiplexed in frequency division multiplexing (FDM), and when data is to be transmitted and received at a specific subcarrier spacing, the BWP configured with the subcarrier spacing may be activated.

In another example, the eNB may configure BWPs having different bandwidths for the UE to reduce power consumption of the UE. For example, when the UE supports a very large bandwidth, for example, 100 MHz and always transmits and receives data using the bandwidth, very large power consumption may be caused. Particularly when there is no traffic, unnecessary monitoring of a DL control channel in the large bandwidth 100 MHz at the UE is very inefficient in terms of power consumption. Therefore, for the purpose of reducing the power consumption of the UE, the eNB may additionally configure a BWP of a relatively small bandwidth, for example, 20 MHz for the UE. In the absence of traffic, the UE may perform a monitoring operation in the bandwidth of 20 MHz, and upon generation of data, transmit/receive data in the BWP of 100 MHz according to a command from the eNB.

As described in <Table 1> above, the eNB may configure one or more BWPs for the UE and transmit, to the UE, information about the bandwidth, frequency position, and numerology of each BWP as a configuration for the BWP.

Figure 6:
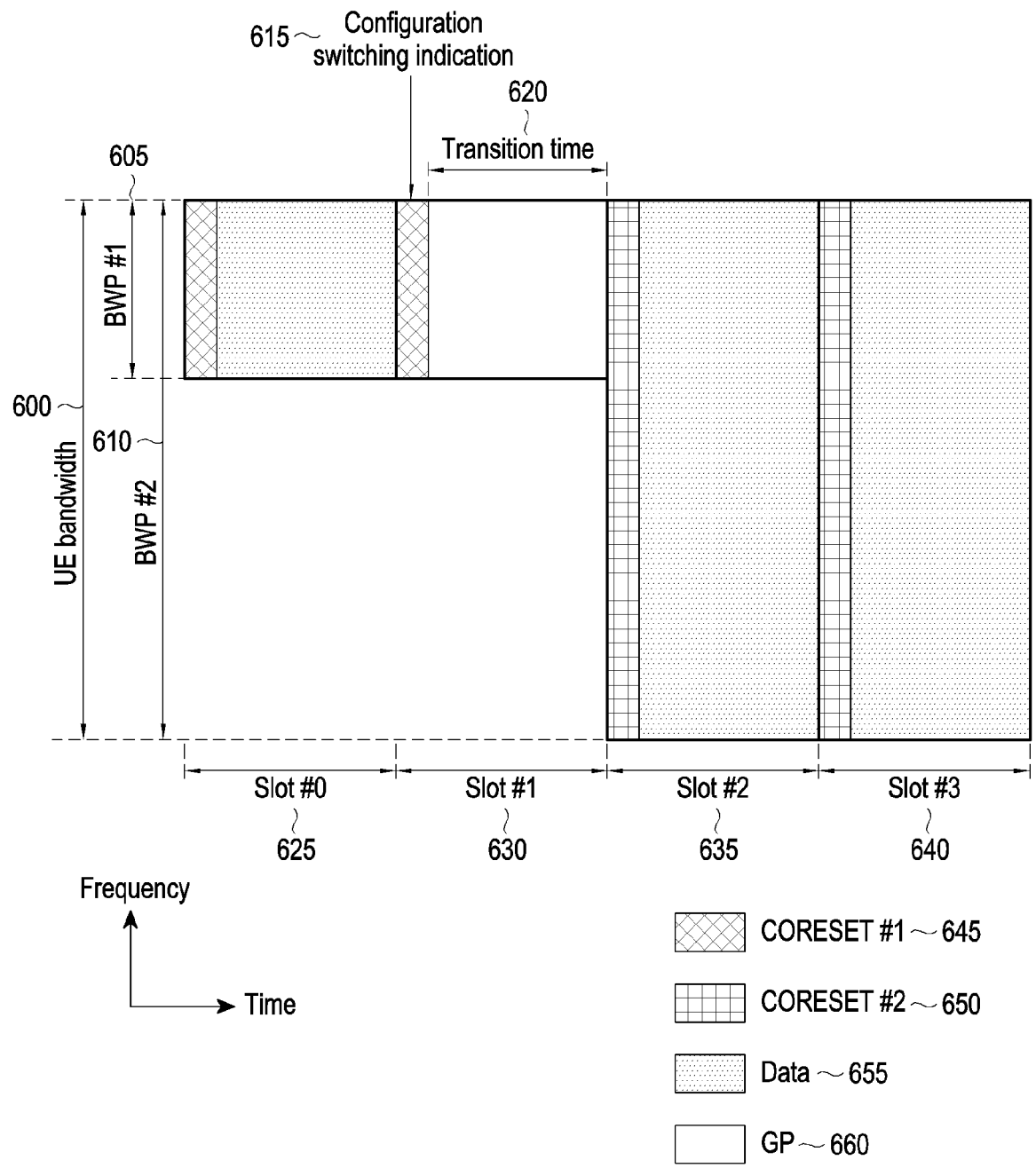
FIG. 6 is a diagram illustrating a method of indicating and changing a BWP according to an embodiment of the disclosure.

FIG. 6 is a diagram illustrating a dynamic configuration indication and switching for a BWP according to an embodiment of the disclosure.

Referring to FIG. 6, one UE may be configured with two BWPs, BWP #1 605 and BWP #2 610 within a UE bandwidth 600. One or more of the configured BWPs 605 and 610 may be activated. In slot #0 625, BWP #1 605 between the BWPs 605 and 610 may be activated, and the UE may monitor a physical downlink control channel (PDCCH) in control region #1 645 configured in BWP #1 605 and transmit/receive data in the remaining part 655 of BWP #1 605. A control region in which the UE receives the PDCCH may be different depending on which of the configured BWPs 605 and 610 is activated, and accordingly, a bandwidth in which the UE monitors the PDCCH may vary.

The eNB may transmit a BWP configuration switching indication 615. Switching a BWP configuration may amount to activating a specific BWP (e.g., switching activation from BWP A to BWP B). The eNB may transmit the configuration switching indication 615 to the UE in a specific slot. After receiving the configuration switching indication 615 from the eNB, the UE may determine a BWP to be activated by applying a switched configuration at a specific time point based on the configuration switching indication 615, and monitor a PDCCH in a control region configured in the activated BWP.

In FIG. 6, the eNB may transmit the configuration switching indication 615 instructing the UE to switch from BWP #1 605 to BWP #2 610 in slot #1 630. After receiving the indication 615, the UE may activate BWP #2 610 according to the indication 615. In this case, a transition time 620 for BWP switching may be required, and accordingly, a time point at which the activated BWP 610 is applied may be determined. FIG. 6 illustrates a case in which the transition time 620 of one slot is required after the configuration switching indication 615 is received. In the transition time 620, data transmission/reception may not be performed (660). Accordingly, BWP #2 610 is activated in slot #2 635, and an operation of transmitting and receiving a control channel and data may be performed in BWP #2 610.

The eNB may preconfigure one or more BWPs for the UE by higher layer signaling (e.g., RRC signaling), and instruct the UE to activate a specific BWP by mapping the configuration switching indication 615 to one of the BWPs preconfigured by the eNB. For example, a log 2N-bit indication may select one of N preconfigured BWPs and indicate the selected BWP. <Table 2> below illustrates an example of indicating a BWP configuration by using a 2-bit indication.

TABLE 2

| Indication value | BWP configuration |
|---|---|
| 00 | Bandwidth configuration A configured by higher layer signaling |
| 01 | Bandwidth configuration B configured by higher layer signaling |
| 10 | Bandwidth configuration C configured by higher layer signaling |
| 11 | Bandwidth configuration D configured by higher layer signaling |

The afore-described configuration switching indication 615 for a BWP may be transmitted from the eNB to the UE by MAC CE signaling or L1 signaling (e.g., common DCI, group-common DCI, or UE-specific DCI). A timing at which BWP activation is applied according to the configuration switching indication 615 for the BWP is determined as follows. The timing at which configuration switching is applied may be based on a predefined value (e.g., applied N (≥1) slots after reception of the configuration switching indication), may be configured for the UE by higher layer signaling (e.g., RRC signaling) from the eNB, or may be included in at least part of the configuration switching indication 615. Alternatively, the timing may be determined in a combination of the above methods. After receiving the configuration switching indication 615 for the BWP, the UE may apply the switched BWP configuration at the time of obtaining the indication according to the above method.

NR provides the following detailed frequency-domain resource allocation (FD-RA) schemes in addition to frequency-domain resource candidate allocation through a BWP indication.

Figure 7A:
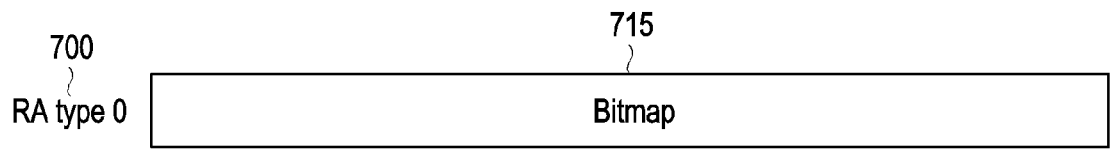
FIGS. 7*a*, 7*b*, and 7*c* are diagrams illustrating frequency-domain resource allocations according to an embodiment of the disclosure.
Figure 7B:
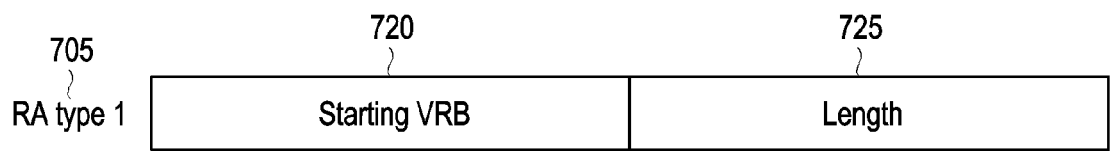
Figure 7C:
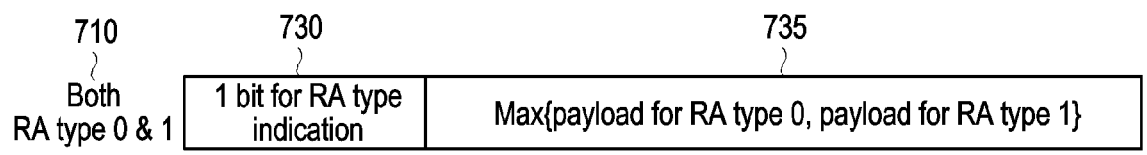

FIGS. 7a, 7b, and 7c are diagrams illustrating FD-RA for a physical downlink shared channel (PDSCH) or a physical uplink shared channel (PUSCH) according to an embodiment of the disclosure. Tree FD-RA schemes configurable through higher layer signaling in NR are shown: type 0 700, type 1 705, and dynamic switch 710.

Referring to FIG. 7a, when the UE is configured to use RA resource type 0 by higher layer signaling 700, some DCI that allocates a PDSCH or a PUSCH to the UE includes a bitmap 715 of NRBG bits. A condition for this operation will be described later. NRBG represents the number of resource block groups (RBGs) determined according to a BWP size allocated by a BWP indication, and configuration 1 or configuration 2 indicated by a higher layer parameter rbg-Size given by higher layer signaling, as illustrated in <Table 3> below. Data is transmitted in an RBG indicated as 1 in the bitmap 715.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Referring to FIG. 7b, when the UE is configured to use RA resource type 1 705 by higher layer signaling, some DCI that allocates a PDSCH or a PUSCH to the UE has FD-RA information of $\lceil \log_2(N_{RB}^{DL,BWP}(N_{RB}^{DL,BWP}+1)/2) \rceil$ bits. A condition for this operation will be described later. The eNB may configure a starting virtual resource block (VRB) 720 and a length 725 of allocated consecutive frequency-domain resources from the starting VRB 720 by the FD-RA information.

Referring to FIG. 7c, when the UE is configured to use both RA resource type 0 and RA resource type 1 710 by higher layer signaling, some DCI that allocates a PDSCH or a PUSCH to the UE has FD-RA information 735 including as many bits as the larger between payload 715 for configuring RA resource type 0 700 and payload 725 for configuring RA resource type 1 725. A condition for this operation will be described later. In the DCI, one bit 730 may be added as a most significant bit (MSB) at the start of the FD-RA information 735. When the bit 730 is 0, it may indicate that RA resource type 0 700 is used, and when the bit 730 is 1, it may indicate that RA resource type 1 705 is used.

Now, a detailed description will be given of channel state measurement and reporting in the 5G communication system.

Channel state information (CSI) may include a channel quality indicator (CQI), a precoding matrix indicator (PMI), a channel state information-reference signal (CSI-RS) resource indicator (CRI), a synchronization signal/physical broadcast channel (SS/PBCH) block resource indicator (SSBRI), a layer indicator (LI), a rank indicator (RI), and/or L1-referenced signal received power (L1-RSRP). The eNB may control time and frequency resources for CSI measurement and reporting of the UE.

For the above-described CSI measurement and reporting, the UE may be configured with at least one of configuration information CSI-ReportConfig for N(≥1) CSI reports, configuration information CSI-ResourceConfig for M (≥1) RS transmission resources, a trigger state list AperiodicTriggerStateList, or a trigger state list CSI-SemiPersistentOnPUSCH-TriggerStateList by higher layer signaling.

In an embodiment, configuration information for CSI measurement and reporting may be given as described in <Table 4> to <Table 10> below.

TABLE 4

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

CSI-ReportConfig information element

```
-- ASN1START
-- TAG-CSI-REPORTCONFIG-START
CSI-ReportConfig : :=                    SEQUENCE {
   reportConfigId                           CSI-ReportConfigId,
   carrier                                  ServCellIndex                     OPTIONAL, -- Need S
   resourcesForChannelMeasurement           CSI-ResourceConfigId,
   csi-IM-ResourcesForInterference          CSI-ResourceConfigId              OPTIONAL, -- Need R
   nzp-CSI-RS-ResourcesForInterference      CSI-ResourceConfigId              OPTIONAL, -- Need R
   reportConfigType                         CHOICE {
      periodic                                 SEQUENCE {
         reportSlotConfig                         CSI-ReportPeriodicityAndOffset,
         pucch-CSI-ResourceList                   SEQUENCE (SIZE (1 . .maxNrofBWPs) ) OF
PUCCH-CSI-Resource
      },
      semiPersistentOnPUCCH                    SEQUENCE {
         reportSlotConfig                         CSI-ReportPeriodicityAndOffset,
         pucch-CSI-ResourceList                   SEQUENCE (SIZE (1 . .maxNrofBWPs) ) OF
PUCCH-CSI-Resource
      },
      semiPersistentOnPUSCH                    SEQUENCE {
         reportSlotConfig                         ENUMERATED {s15, s110, s120, s140, s180, s1160,
s1320},
         reportSlotOffsetList                     SEQUENCE (SIZE (1. . maxNrofUL-Allocations) ) OF
INTEGER (0 . . 32),
         p0alpha                                  P0-PUSCH-AlphaSetId
      },
      aperiodic                                SEQUENCE {
         reportSlotOffsetList                  SEQUENCE (SIZE (1 . .maxNrofUL-Allocations) ) OF
INTEGER (0 . . 32)
      }
   },
   reportQuantity                           CHOICE {
      none                                     NULL,
      cri-RI-PMI-CQI                           NULL,
      cri-RI-il                                NULL,
      cri-RI-il-CQI                            SEQUENCE {
         pdsch-BundleSizeForCSI                   ENUMERATED {n2, n4)
OPTIONAL -- Need S
      },
      cri-RI-CQI                               NULL,
      cri-RSRP                                 NULL,
      ssb-Index-RSRP                           NULL,
      cri-RI-LI-PMI-CQI                        NULL
   },
   reportFreqConfiguration                  SEQUENCE {
      cqi-FormatIndicator                      ENUMERATED { widebandCQI, subbandCQI }
OPTIONAL, -- Need R
      pmi-FormatIndicator                      ENUMERATED { widebandPMI, subbandPMI }
OPTIONAL, -- Need R
   csi-ReportingBand                           CHOICE {
      subbands3                                   BIT STRING (SIZE (3)),
      subbands4                                   BIT STRING (SIZE (4) ) ,
      subbands5                                   BIT STRING (SIZE (5) ) ,
      subbands 6                                  BIT STRING (SIZE (6) ),
      subbands7                                   BIT STRING (SIZE(7) ) ,
      subbands8                                   BIT STRING (SIZE (8) ) ,
      subbands9                                   BIT STRING (SIZE (9) ) ,
      subbands10                                  BIT STRING (SIZE (10) ) ,
      subbands11                                  BIT STRING (SIZE (11) ) ,
      subbands12                                  BIT STRING (SIZE (12) ) ,
      subbands13                                  BIT STRING (SIZE (13) ) ,
      subbands14                                  BIT STRING (SIZE (14) ) ,
      subbands15                                  BIT STRING (SIZE (15) ) ,
      subbands16                                  BIT STRING (SIZE (16) ) ,
      subbands17                                  BIT STRING (SIZE (17) ) ,
      subbands18                                  BIT STRING (SIZE (18) ) ,
      . . .,
      subbands19-v1530                            BIT STRING (SIZE (19) )
   } OPTIONAL -- Need S
}
OPTIONAL, -- Need R
   timeRestrictionForChannelMeasurements    ENUMERATED {configured, notConfigured} ,
```

TABLE 4-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
    timeRestrictionForInterferenceMeasurements      ENUMERATED {configured, notConfigured} ,
    codebookConfig                                  CodebookConfig
OPTIONAL, -- Need R
    dummy                                           ENUMERATED {n1, n2}
OPTIONAL, -- Need R
    groupBasedBeamReporting                         CHOICE {
        enabled                                         NULL,
        disabled                                        SEQUENCE {
            nrofReportedRS                                  ENUMERATED {n1, n2, n3, n4}
OPTIONAL -- Need S
        }
    },
    cqi-Table                                       ENUMERATED {table1, table2, table3, spare1}
OPTIONAL, -- Need R
    subbandSize                                     ENUMERATED {value1, value2},
    non-PMI-PortIndication                          SEQUENCE (SIZE (1. .maxNrofNZP-CSI-RS-ResourcesPerConfig) )
OF PortIndexFor8Ranks OPTIONAL, -- Need R
    ...,
    [[
    semiPersistentOnPUSCH-v1530                     SEQUENCE {
        reportSlotConfig-v1530                          ENUMERATED {s14, s18, s116}
    }
OPTIONAL -- Need R
    ]]
}
CSI-ReportPeriodicityAndOffset : := CHOICE {
    slots4                                          INTEGER (0 .. 3) ,
    slots5                                          INTEGER (0 .. 4) ,
    slots8                                          INTEGER (0 .. 7) ,
    slots10                                         INTEGER (0 .. 9) ,
    slots16                                         INTEGER (0 .. 15) ,
    slots20                                         INTEGER (0 .. 19) ,
    slots40                                         INTEGER (0 .. 39) ,
    slots80                                         INTEGER (0 .. 79) ,
    slots160                                        INTEGER (0 .. 159) ,
    slots320                                            INTEGER (0 .. 319)
}
PUCCH-CSI-Resource : :=                             SEQUENCE {
    uplinkBandwidthPartId                               BWP-Id,
    pucch-Resource                                      PUCCH-ResourceId
}
PortIndexFor8Ranks : :=                             CHOICE {
    portIndex8                                          SEQUENCE {
        rank1-8                                             PortIndex8
OPTIONAL, -- Need R
        rank2-8                                             SEQUENCE (SIZE (2) ) OF PortIndex8
OPTIONAL, -- Need R
        rank3-8                                             SEQUENCE (SIZE (3) ) OF PortIndex8
OPTIONAL, -- Need R
        rank4-8                                             SEQUENCE (SIZE (4) ) OF PortIndex8
OPTIONAL, -- Need R
        rank5-8                                             SEQUENCE (SIZE (5) ) OF PortIndex8
OPTIONAL, -- Need R
        rank6-8                                             SEQUENCE (SIZE (6) ) OF PortIndex8
-- Need R OPTIONAL,
        rank7-8                                             SEQUENCE (SIZE(7)) OF PortIndex8
-- Need R OPTIONAL,
        rank8-8                                             SEQUENCE (SIZE (8) ) OF PortIndex8
OPTIONAL -- Need R
    },
    portIndex4                                          SEQUENCE {
        rank1-4                                             PortIndex4
OPTIONAL, -- Need R
        rank2-4                                             SEQUENCE (SIZE(2) ) OF PortIndex4
OPTIONAL, -- Need R
        rank3-4                                             SEQUENCE (SIZE (3) ) OF PortIndex4
OPTIONAL, -- Need R
        rank4-4                                             SEQUENCE (SIZE (4) ) OF PortIndex4
OPTIONAL -- Need R
    },
    portIndex2                                          SEQUENCE {
        rank1-2                                             PortIndex2
OPTIONAL, -- Need R
        rank2-2                                             SEQUENCE (SIZE (2) ) OF PortIndex2
```

TABLE 4-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

```
OPTIONAL -- Need R
   },
   portIndex1                         NULL
}
PortIndex8 : : =                      INTEGER (0 .. 7)
PortIndex4 : : =                      INTEGER (0 .. 3)
PortIndex2 : : =                      INTEGER (0 .. 1)
-- TAG-CSI-REPORTCONFIG-STOP
-- ASN1STOP
```

CSI-ReportConfig field descriptions carrier

Indicates in which serving cell the CSI-ResourceConfig indicated below are to be found. If the field is absent, the resources are on the same serving cell as this report configuration.
codebookConfig Codebook configuration for Type-1 or Type-II including codebook subset restriction.
cqi-FormatIndicator Indicates whether the UE shall report a single (wideband) or multiple (subband) CQI. (see TS 38.214 [19], clause 5.2.1.4).
cqi-Table Which CQI table to use for CQI calculation (see TS 38.214 [19], clause 5.2.2.1).
csi-IM-ResourcesForInterference CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannel Measurement.
csi-ReportingBand Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4).
dummy This field is not used in the specification. If received it shall be ignored by the UE.
groupBasedBeamReporting Turning on/off group beam based reporting (see TS 38.214 [19], clause 5.2.1.4)
non-PMI-Portindication Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2).
The first entry in non-PMI-Portindication corresponds to the NZP-CSI-RS-Resource indicated by the first entry in nzp-CSI-RS-Resources in the NZP-CSI-RS-ResourceSet indicated in the first entry of nzp-CSI-RS-ResourceSetList of the CSI-ResourceConfig whose CSI-ResourceConfigId is indicated in a CSI-MeasId together with the above CSI-ReportConfigId; the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the NZP-CSI-RS-Resource indicated by the last entry in TABLE 4-continued The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

nzp-CSI-RS-Resources in the in the NZP-CSI-RS-ResourceSet indicated in the first entry of nzp-CSI-RS-ResourceSetList of the same CSI-ResourceConfig. Then the next entry corresponds to the NZP-CSI-RS-Resource indicated by the first entry in nzp-CSI-RS-Resources in the NZP-CSI-RS-ResourceSet indicated in the second entry of nzp-CSI-RS-ResourceSetList of the same CSI-ResourceConfig and so on.
nrofReportedRS The number (N) of measured RS resources to be reported per report setting in a non-group-based report. N <= N_max, where N_max is either 2 or 4 depending on UE capability.
(see TS 38.214 [19], clause 5.2.1.4) When the field is absent the UE applies the value 1
nzp-CSI-RS-ResourcesForInterference NZP CSI RS resources for interference measurement. csi-ResourceConfigId of a CSI-ResourceConfig included in the configuration of the serving cell indicated with the field "carrier" above. The CSI-ResourceConfig indicated here contains only NZP-CSI-RS resources. The bwp-Id in that CSI-ResourceConfig is the same value as the bwp-Id in the CSI-ResourceConfig indicated by resourcesForChannelMeasurement.
p0alpha Index of the p0-alpha set determining the power control for this CSI report transmission (see TS 38.214 [19], clause 6.2.1.2).
pdsch-BundleSizeForCSI PRB bundling size to assume for CQI calculation when reportQuantity is CRI/RI/i1/CQI. If the field is absent, the UE assumes that no PRB bundling is applied (see TS 38.214 [19], clause 5.2.1.4.2).
pmi-FormatIndicator Indicates whether the UE shall report a single (wideband) or multiple (subband) PMI. (see TS 38.214 [19], clause 5.2.1.4).
pucch-CSI-ResourceList Indicates which PUCCH resource to use for reporting on PUCCH.
reportConfigType Time domain behavior of reporting configuration
reportFreqConfiguration Reporting configuration in the frequency domain. (see TS 38.214 [19], clause 5.2.1.4).
reportQuantity The CSI related quantities to report. Corresponds to L1 parameter 'ReportQuantity' (see TS 38.214 [19], clause 5.2.1).
reportSlotConfig Periodicity and slot offset (see TS 38.214 [19], clause 5.2.1.4).
reportSlotConfig-v1530

Extended value range for reportSlotConfig for semi-persistent CSI on PUSCH. If the field is present, the UE shall ignore the value provided in the legacy field (semiPersistentOnPUSCH.reportSlotConfig).
reportSlotOffsetList Timing offset Y for semi persistent reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on. The first report is transmitted in slot n+Y, second report in n+Y+P, where P is the configured periodicity.
Timing offset Y for aperiodic reporting using PUSCH. This field lists the allowed offset values. This list must have the same number of entries as the pusch-TimeDomainAllocationList in PUSCH-Config. A particular value is indicated in DCI. The network indicates in the DCI field of the UL grant, which of the configured report slot offsets the UE shall apply. The DCI value 0 corresponds to the first report slot offset in this list, the DCI value 1 corresponds to the second report slot offset in this list, and so on (see TS 38.214 [19], clause 5.2.3).
resourcesForChannelMeasurement Resources for channel measurement. csi-ResourceConfigId of a CSI-ResourceConfig included in the configuration of the serving cell indicated with the field "carrier" above. The CSI-ResourceConfig indicated here contains only NZP-CSI-RS resources and/or SSB resources. This CSI-ReportConfig is associated with the DL BWP indicated by bwp-Id in that CSI-ResourceConfig.
subbandSize Indicates one out of two possible BWP-dependent values for the subband size as indicated in TS 38.214 [19], table 5.2.1.4-2 . If csi-ReportingBand is absent, the UE shall ignore this field.
timeRestrictionForChannelMeasurements Time domain measurement restriction for the channel (signal) measurements (see TS 38.214 [19], clause 5.2.1.1)

TABLE 4-continued

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

timeRestrictionForInterferenceMeasurements

Time domain measurement restriction for interference measurements (see TS 38.214 [19], clause 5.2.1.1)

TABLE 5

The IE CSI-ResourceConfig defines a group of one or more NZP-CSI-RS-ResourceSet, CSI-IM-ResourceSet and/or CSI-SSB-ResourceSet.

CSI-ResourceConfig information element

```
-- ASN1START
-- TAG-CSI-RESOURCECONFIG-START

CSI-ResourceConfig : :=      SEQUENCE {
    csi-ResourceConfigId       CSI-ResourceConfigId,
    csi-RS-ResourceSetList     CHOICE {
       nzp-CSI-RS-SSB              SEQUENCE {
           nzp-CSI-RS-ResourceSetList    SEQUENCE (SIZE
(1. . maxNrofNZP-CSI-RS-ResourceSetsPerConfig) ) OF NZP-CSI-RS-ResourceSetId
OPTIONAL, -- Need R
           csi-SSB-ResourceSetList       SEQUENCE (SIZE (1. . maxNrofCSI-SSB-ResourceSetsPerConfig) )
OF CSI-SSB-ResourceSetId
OPTIONAL -- Need R
       } ,
       csi-IM-ResourceSetList      SEQUENCE (SIZE (1 . .maxNrofCSI-IM-ResourceSetsPerConfig) ) OF
CSI-IM-ResourceSetId
    } ,
    bwp-Id                     BWP-Id,
    resourceType               ENUMERATED { aperiodic, semiPersistent, periodic } ,
    . . .
}
-- TAG-CSI-RESOURCECONFIG-STOP
-- ASN1 STOP
```

CSI-ResourceConfig field descriptions bwp-Id

The DL BWP which the CSI-RS associated with this CSI-ResourceConfig are located in (see TS 38.214 [19], clause 5.2.1.2
csi-ResourceConfigId Used in CSI-ReportConfig to refer to an instance of CSI-ResourceConfig
csi-RS-ResourceSetList Contains up to maxNrofNZP-CSI-RS-ResourceSetsPerConfig resource sets if ResourceConfigType is 'aperiodic' and 1 otherwise (see TS 38.214 [19], clause 5.2.1.2)
csi-SSB-ResourceSetList List of SSB resources used for beam measurement and reporting in a resource set (see TS 38.214 [19], section FFS_Section)
resource Type Time domain behavior of resource configuration (see TS 38.214 [19], clause 5.2.1.2). It does not apply to resources provided in the csi-SSB-ResourceSetList.

TABLE 6

The IE NZP-CSI-RS-ResourceSet is a set of Non-Zero-Power (NZP) CSI-RS resources (their IDs) and set-specific parameters.

NZP-CSI-RS-ResourceSet information element

```
-- ASN1START
-- TAG-NZP-CSI-RS-RESOURCESET-START
NZP-CSI-RS-ResourceSet ::=    SEQUENCE {
    nzp-CSI-ResourceSetId     NZP-CSI-RS-ResourceSetId,
    nzp-CSI-RS-Resources      SEQUENCE (SIZE (1 . .maxNrofNZP-CSI-RS-ResourcesPerSet) ) OF NZP-CSI-RS-ResourceId,
    repetition                ENUMERATED { on, off }
OPTIONAL, -- Need S
    aperiodicTriggeringOffset INTEGER (0 . . 6)
OPTIONAL, -- Need S
    trs-Info                  ENUMERATED { true}
OPTIONAL, -- Need R
-- TAG-NZP-CSI-RS-RESOURCESET-STOP
-- ASN1STOP
```

NZP-CSI-RS-ResourceSet field descriptions aperiodic TriggeringOffset

Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0.

nzp-CSI-RS-Resources

NZP-CSI-RS-Resources associated with this NZP-CSI-RS resource set (see TS 38.214 [19], clause 5.2). For CSI, there are at most 8 NZP CSI RS resources per resource set repetition Indicates whether repetition is on/off. If the field is set to 'OFF' or if the field is absent, the UE may not assume
that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"

trs-Info

Indicates that the antenna port for all NZP-CSI-RS resources in the CSI-RS resource set is same. If the field is absent or released the UE applies the value "false" (see TS 38.214 [19], clause 5.2.2.3.1).

40

TABLE 7

The IE CSI-SSB-ResourceSet is used to configure one SS/PBCH block resource set which refers to SS/PBCH as indicated in ServingCellConfigCommon.
CSI-SSB-ResourceSet information element

```
-- ASN1START
-- TAG-CSI-SSB-RESOURCESET-START
CSI-SSB-ResourceSet ::= SEQUENCE {
    csi-SSB-ResourceSetId   CSI-SSB-ResourceSetId,
    csi-SSB-ResourceList    SEQUENCE (SIZE (1 . .maxNrofCSI-SSB-ResourcePerSet) ) OF SSB-Index,
    ...
}
-- TAG-CSI-SSB-RESOURCESET-STOP
-- ASN1STOP
```

TABLE 8

The IE CSI-IM-ResourceSet is used to configure a set of one or more CSI Interference Management (IM) resources (their IDs) and set-specific parameters.

CSI-IM-ResourceSet information element

```
-- ASN1START
-- TAG-CSI-IM-RESOURCESET-START
```

TABLE 8-continued

The IE CSI-IM-ResourceSet is used to configure a set of one or more CSI Interference Management (IM) resources (their IDs) and set-specific parameters.

```
CSI-IM-ResourceSet : := SEQUENCE {
    csi-IM-ResourceSetId    CSI-IM-ResourceSetId,
    csi-IM-Resource         SEQUENCE (SIZE (1 . .maxNrofCSI-IM-ResourcePerSet) )
                            OF
CSI-IM-ResourceId,
    ...
}
-- TAG-CSI-IM-RESOURCESET-STOP
-- ASN1STOP
```

CSI-IM-ResourceSet field descriptions csi-IM-Resources

CSI-IM-Resources associated with this CSI-IM-ResourceSet (see TS 38.214 [19], clause 5.2)

TABLE 9

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

CSI-Aperiodic TriggerStateList information element

```
-- ASN1START
-- TAG-CSI-APERIODICTRIGGERSTATELIST-START
CSI-AperiodicTriggerStateList : :=    SEQUENCE (SIZE (1 . .maxNrOfCSI-AperiodicTriggers) ) OF
CSI-AperiodicTriggerState
CSI-AperiodicTriggerState : :=        SEQUENCE {
    associatedReportConfigInfoList    SEQUENCE
(SIZE (1 . .maxNrofReportConfigPerAperiodicTrigger) ) OF CSI-AssociatedReportConfigInfo,
    ...
}
CSI-AssociatedReportConfigInfo : :=    SEQUENCE {
    reportConfigId                     CSI-ReportConfigId,
    resourcesForChannel                CHOICE {
        nzp-CSI-RS                     SEQUENCE {
            resourceSet                INTEGER
(1 . .maxNrofNZP-CSI-RS-ResourceSetsPerConfig) ,
            qcl-info                   SEQUENCE
(SIZE (1 . .maxNrofAP-CSI-RS-ResourcesPerSet) ) OF TCI-StateId OPTIONAL -- Cond Aperiodic
        },
        csi-SSB-ResourceSet            INTEGER (1 . .maxNrofCSI-SSB-ResourceSetsPerConfig)
    },
    csi-IM-ResourcesForInterference    INTEGER (1 . .maxNrofCSI-IM-ResourceSetsPerConfig)
OPTIONAL, -- Cond CSI-IM-ForInterference
    nzp-CSI-RS-ResourcesForInterference INTEGER (1. .maxNrofNZP-CSI-RS-ResourceSetsPerConfig)
OPTIONAL, -- Cond NZP-CSI-RS-ForInterference
    ...
}
-- TAG-CSI-APERIODICTRIGGERSTATELIST-STOP
-- ASN1STOP
```

CSI-AssociatedReportConfigInfo field descriptions csi-IM-ResourcesForInterference CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (1 corresponds to the first entry, 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (1 corresponds to the first entry, 2 to the second entry, and so on).
nzp-CSI-RS-ResourcesForInterference NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (1 corresponds to the first entry, 2 to the second entry, and so on).

TABLE 9-continued

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE will perform measurement of CSI-RS (reference signals) and aperiodic reporting on L1 according to all entries in the associatedReportConfigInfoList for that trigger state.

qcl-info

List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-States ToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSt-RS-ResourceSet, second entry in qcl-info-forChannel corresponds to second entry in nzp-CSI-RS-Resources, and so on (see TS 38.214 [19], clause 5.2.1.5.1)
reportConfigId The reportConfigId of one of the CSI-ReportConfigToAddMod configured in CSI-MeasConfig
resourceSet NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (1 corresponds to the first entry, 2 to thesecond entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

TABLE 10

The CSI-SemiPersistentOnPUSCH-TriggerStateList IE is used to configure the UE
with list of trigger states for semi-persistent reporting of channel state information on L1. See
also TS 38.214 [19], clause 5.2.
```
        CSI-SemiPersistentOnPUSCH-TriggerStateList information element
-- ASN1START
-- TAG-CSI-SEMIPERSISTENTONPUSCHTRIGGERSTATELIST-START
CSI-SemiPersistentOnPUSCH-TriggerStateList ::=     SEQUENCE (SIZE
(1..maxNrOfSemiPersistentPUSCH-Triggers) ) OF CSI-SemiPersistentOnPUSCH-TriggerState
CSI-SemiPersistentOnPUSCH-TriggerState ::=         SEQUENCE {
    associatedReportConfigInfo                         CSI-ReportConfigId,
    ...
}
-- TAG-CSI-SEMIPERSISTENTONPUSCHTRIGGERSTATELIST-STOP
-- ASN1STOP
```

Each report configuration CSI-ReportConfig may be associated with one DL BWP identified by a higher layer parameter, bwp-Id given by a CSI resource configuration, CSI-ResourceConfig associated with the report configuration. For time-domain reporting for each report configuration CSI-ReportConfig, 'aperiodic', 'semi-persistent', or 'periodic' reporting is supported, which may be configured for the UE by a higher layer parameter reportConfigType from the eNB. For semi-persistent CSI reporting, semi-permanent reporting on a PUCCH configured by semi-PersistentOnPUCCH and semi-persistent reporting on a PUSCH configured by semi-PersistentOnPUSCH are supported. In the case of periodic or semi-permanent CSI reporting, the UE may be configured with a PUCCH resource or a PUSCH resource for transmitting CSI by higher layer signaling from the eNB. A CSI transmission periodicity and slot offset may be given as the numerology of a UL BWP configured for transmission of a CSI report. In the case of aperiodic CSI reporting, the eNB may schedule a PUSCH resource for CSI transmission for the UE by L1 signaling (e.g., DCI format 0_1).

Regarding the above-described CSI resource configuration CSI-ResourceConfig, each CSI resource configuration CSI-ReportConfig may include S (≥1) CSI resource sets (given by the higher layer parameter csi-RS-Resource-SetList). The CSI resource set list may include a non-zero power (NZP) CSI-RS resource set and an SS/PBCH block set, or a CSI-interference measurement (CSI-IM) resource set. Each CSI resource configuration may be located in a DL BWP identified by the higher layer parameter bwp-Id, and linked to a CSI report configuration of the same DL BWP. The time-domain behavior of a CSI-RS resource in the CSI resource configuration may be set to one of 'aperiodic', 'periodic', and 'semi-permanent' by the higher layer parameter resourceType. For a periodic or semi-permanent CSI resource configuration, the number of CSI-RS resource sets may be limited to 1 (S=1), and a configured periodicity and slot offset may be given as the numerology of a DL BWP identified by bwp-Id. The UE may be configured with one or more CSI resource configurations for channel measurement or interference measurement by higher layer signaling from the eNB. For example, the CSI resource configuration may include at least one of the following resources.

CSI-IM resource for interference measurement
NZP CSI-RS resource for interference measurement
NZP CSI-RS resource for channel measurement Regarding CSI-RS resource sets associated with a resource configuration set to 'aperiodic', 'periodic', or 'semi-permanent' by the higher layer parameter reportType, a trigger state for a CSI-RS report configuration set to 'aperiodic' by reportType and a resource configuration for channel or interference measurement for one or more CCs may be configured by a higher layer parameter CSI-AperiodicTriggerStateList.

The UE may perform aperiodic CSI reporting using a PUSCH, perform periodic CSI reporting using a PUCCH, and perform semi-permanent CSI reporting, using a PUSCH when triggered or activated by DCI, and using a PUCCH after activated by a MAC CE.

A CSI resource configuration may also be configured aperiodically, periodically, or semi-permanently. The CSI report configuration and the CSI resource configuration may be combined based on <Table 11> below.

TABLE 11

Triggering/Activation of CSI Reporting for the possible CSI-RS Configurations.

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

Aperiodic CSI reporting may be triggered by a 'CSI request' field in DCI format 0_1 as an example corresponding to DCI that schedules a PUSCH. The UE may obtain DCI format 0_1 by monitoring a PDCCH, and obtain resource allocation information for the PUSCH and the CSI request field from DCI format 0_1. The CSI request field may be configured in NTS (=0, 1, 2, 3, 4, 5, or 6) bits, where NTS may be determined by a higher layer parameter reportTriggerSize. One of one or more aperiodic CSI reporting trigger states configurable by the higher layer parameter CSI-AperiodicTriggerStateList may be triggered by the CSI request field.

When all bits of the CSI request field are 0, this may mean that no CSI report is requested.
When the number M of CSI trigger states in the configured CSI-AperiodicTriggerStateList is greater than $2^{NTS}-1$, the M CSI trigger states may be mapped to the $2^{NTS}-1$ CSI trigger states according to a predefined mapping relationship, and one of the $2^{NTS}-1$ CSI trigger states may be indicated by the CSI request field.
When the number M of CSI trigger states in the configured CSI-AperiodicTriggerStateList is equal to or less than $2^{NTS}-1$, one of the M CSI trigger states may be indicated by the CSI request field.

<Table 12> below illustrates an exemplary relationship between the CSI request field and CSI trigger states that may be indicated by the CSI request field.

TABLE 12

| CSI request field | CSI trigger state | CSI-ReportConfigId | CSI-ResourceConfigId |
|---|---|---|---|
| 00 | no CSI request | N/A | N/A |
| 01 | CSI trigger state#1 | CSI report#1 CSI report#2 | CSI resource#1, CSI resource#2 |
| 10 | CSI trigger state#2 | CSI report#3 | CSI resource#3 |
| 11 | CSI trigger state#3 | CSI report#4 | CSI resource#4 |

The UE may perform measurement on a CSI resource in the CSI trigger state triggered by the CSI request field, and generate CSI (including at least one of a CQI, a PMI, a CRI, an SSBRI, an LI, an RI, or L1-RSRP). The UE may transmit the generated CSI using a PUSCH scheduled by DCI format 0_1. When a 1-bit uplink shared channel (UL-SCH) indicator indicates '1' in DCI format 0_1, the generated CSI and UL data from a UL-SCH may be multiplexed and transmitted in a PUSCH resource scheduled by DCI format 0_1. When the UL-SCH indicator indicates '0' in DCI format 0_1, only the CSI may be transmitted without the UL data in the PUSCH resource scheduled by DCI format 0_1.

Figure 8:
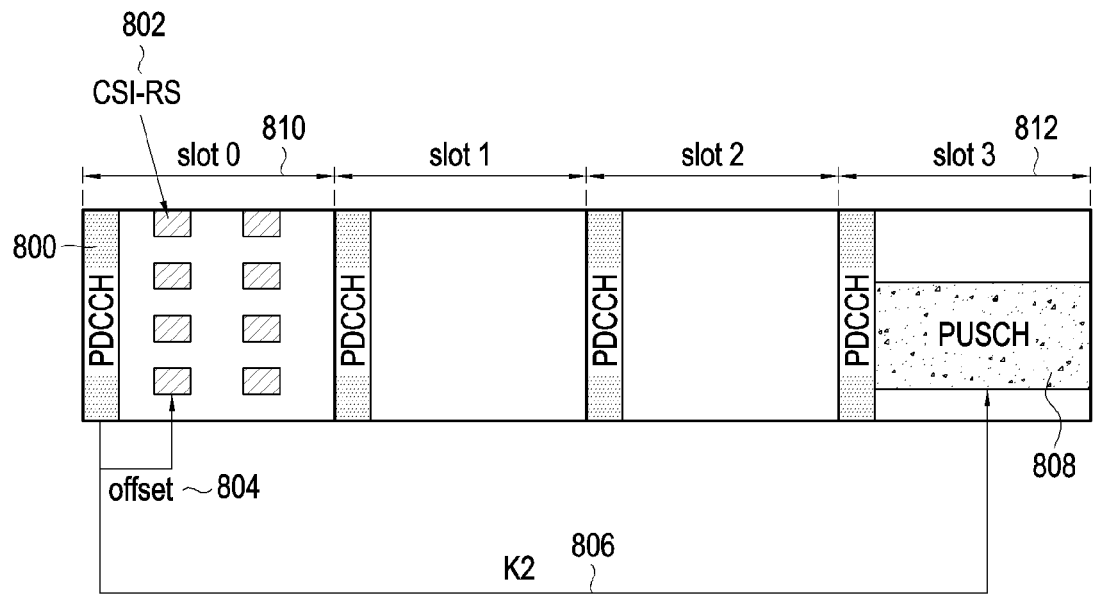
FIGS. 8 and 9 are diagrams illustrating exemplary aperiodic channel state reporting according to an embodiment of the disclosure.
Figure 9:
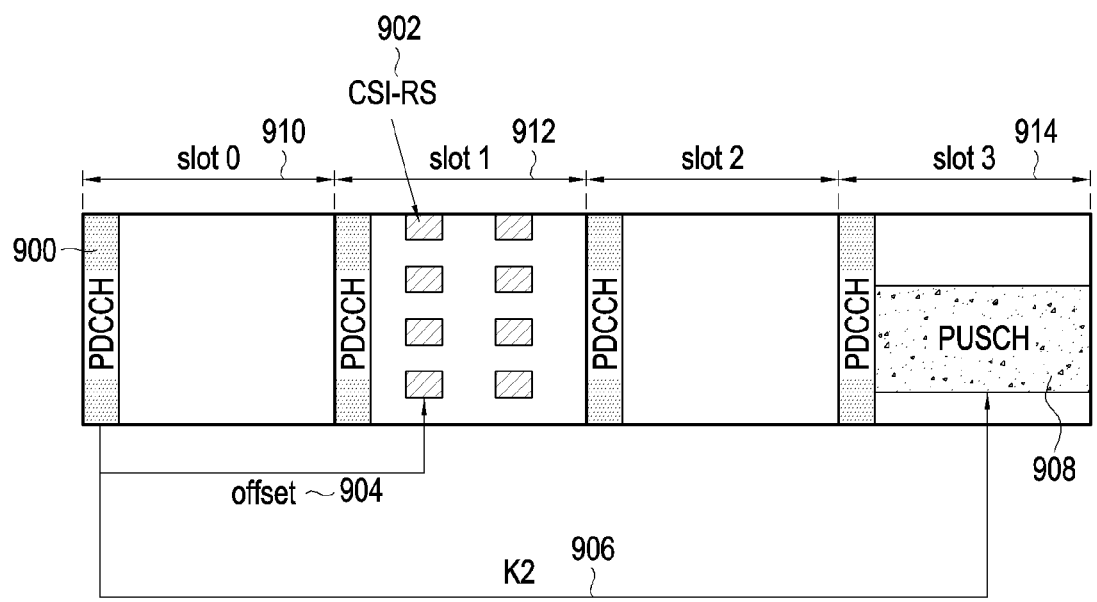

FIGS. 8 and 9 are diagrams illustrating examples of aperiodic channel state reporting according to an embodiment of the disclosure.

Referring to FIG. 8, the UE may obtain DCI format 0_1 by monitoring a PDCCH 800 and obtain scheduling information for a PUSCH 808 and a CSI request field from the DCI format 0_1. The CSI request field provides resource information about a CSI-RS 802 to be measured by the UE. The UE may identify a time to measure a resource of the CSI-RS 602 based on a reception time of DCI format 0_1 and a CSI resource set configuration (e.g., aperiodicTriggeringOffset in NZP-CSI-RS-ResourceSet).

More specifically, the UE may obtain an offset X 804 from a parameter aperiodicTriggeringOffset in the NZP-CSI-RS resource set given by higher layer signaling from the eNB. The offset X 804 means an offset between a slot in which DCI triggering aperiodic CSI reporting is received and a slot in which the CSI-RS resource is transmitted. For example, the value of aperiodicTriggeringOffset and the offset X 804 may be in a mapping relationship described in <Table 13> below.

TABLE 13

| aperiodicTriggeringOffset | Offset X |
| --- | --- |
| 0 | 0 slot |
| 1 | 1 slot |
| 2 | 2 slots |
| 3 | 3 slots |
| 4 | 4 slots |
| 5 | 16 slots |
| 6 | 24 slots |

In the illustrated example of FIG. 8, the offset X 804 is set to 0. In this case, the UE may receive the CSI-RS 802 in slot 0 810 in which DCI format 0_1 for triggering aperiodic CSI reporting is received. The UE may obtain the scheduling information (resource allocation fields in DCI format 0_1 described above) for the PUSCH 808 for CSI reporting from DCI format 0_1. For example, the UE may obtain information about a slot in which the PUSCH 808 is to be transmitted from a time-domain resource allocation field in DCI format 0_1. In the example of FIG. 8, the value of K2 806 corresponding to a PDCCH-to-PUSCH slot offset is 3. Accordingly, the PUSCH 808 including CSI related to the CSI-RS 802 may be transmitted in slot 3 812 spaced apart from the reception time of the PDCCH 800 by 3 slots.

Referring to FIG. 9, the UE may obtain DCI format 0_1 by monitoring a PDCCH 900, and obtain scheduling information for a PUSCH 908 and a CSI request field from DCI format 0_1. The CSI request field provides resource information about a CSI-RS 902 to be measured by the UE. In the illustrated example of FIG. 9, an offset X 904 for the CSI-RS is set to 1. In this case, the UE may receive the CSI-RS 902 at a time spaced apart from slot 0 910 in which DCI format 0_1 triggering aperiodic CSI reporting is received by 1 slot, that is, in slot 1 912. In the illustrated example, the value of K2 906 corresponding to a PDCCH-to-PUSCH slot offset is given as 3 for the UE. Accordingly, the PUSCH 908 including CSI related to the CSI-RS 902 may be transmitted in slot 3 914 spaced apart from the reception time of the PDCCH 900 by 3 slots, that is, slot 0 910.

Similarly to the CSI-RS transmitted by the eNB, the UE may transmit a sounding reference signal (SRS). The SRS may be used for UL channel quality measurement and UL beam tracking of the eNB. Configuration information for the SRS transmission is provided to the UE by the eNB. To provide the configuration information for the SRS transmission to the UE, the eNB may provide at least one SRS configuration for each UL BWP, and also configure at least one SRS resource set for each SRS configuration.

For example, the SRS configuration may include the following signaling information.

srs-ResourceSetId: the index of an SRS resource set srs-ResourceIdList: the IDs of SRS resources referred to in the SRS resource set resourceType: a time-domain transmission configuration for the SRS resources referred to in the SRS resource set, which may be set to one of 'periodic', 'semi-persistent', and 'aperiodic'. If resourceType is set to 'periodic' or 'semi-persistent', associated CSI-RS information may be provided according to the usage of the SRS resource set. If resourceType is set to 'aperiodic', an aperiodic SRS resource trigger list and a slot offset may be provided to the UE, and associated CSI-RS information may be provided according to the usage of the SRS resource set.

usage: a configuration for the usage of the SRS resources referred to in the SRS resource set, which may be set to one of 'beamManagement', 'codebook', 'nonCodebook', and 'antenna Switching'.

alpha, p0, pathlossReferenceRS, srs-PowerControlAdjustmentStates: these provide parameter configurations for adjusting the transmission power of the SRS resources referred to in the SRS resource set.

The UE may understand that the SRS resources included in a set of SRS resource indexes referred to in the SRS resource set follows information configured in the SRS resource set.

The eNB and the UE may exchange higher layer parameters to transmit individual configuration information for the SRS resources. For example, the individual configuration information for the SRS resources may include time-frequency domain mapping information within a slot of the SRS resources, which may include information about frequency hopping within a slot or between slots of the SRS resources. In another example, the individual configuration information for the SRS resources may include a time-domain transmission configuration for the SRS resources, and the time-domain transmission configuration may be set to one of 'periodic', 'semi-persistent', or 'aperiodic'. Alternatively, the time-domain transmission configuration may be limited to have the same time-domain transmission configuration as the SRS resource set including the SRS resources. When the time-domain transmission configuration of the SRS resources is set to 'periodic' or 'semi-persistent', a periodicity and a slot offset (e.g., periodicityAndOffset) for SRS transmission may be additionally included. In another example, the individual configuration information for the SRS resources may include a configuration for a spatial-domain transmission filter of the UE that transmits the SRS resources, which may be provided in spatial relation information spatialRelationInfo for an SRS. When spatialRelationInfo included in the individual configuration information for the SRS resources refers to the index of a CSI-RS resource or a synchronization signal block (SSB), it may be understood that the UE uses the same spatial-domain transmission filter as that used to receive the referred CSI-RS resource or SSB. Alternatively, when spatialRelationInfo refers to another SRS resource index, it may be understood that the UE uses the spatial domain transmission filter used when transmitting the referred SRS resource.

The eNB may activate or deactivate, or trigger SRS transmission for the UE by higher layer signaling including RRC signaling or MAC CE signaling or by L1 signaling including DCI.

The eNB may activate or deactivate periodic SRS transmission for the UE by higher layer signaling. The eNB may instruct the UE to activate an SRS resource set for which resourceType is set to periodic by higher layer signaling, and the UE may transmit an SRS resource referred to in the activated SRS resource set. Time-frequency domain resource mapping in a slot of the SRS resource to be transmitted is based on resource mapping information configured for the SRS resource, and slot mapping including a transmission periodicity and a slot offset is based on periodicityAndOffset configured for the SRS resource. In addition, for a spatial-domain transmission filter applied to the SRS resource to be transmitted, spatialRelationInfo configured for the SRS resource or associated CSI-RS information configured for the SRS resource set including the SRS resource may be referred to. The UE may transmit the SRS resource in a UL BWP activated for the activated periodic SRS resource by higher layer signaling.

The eNB may activate or deactivate semi-persistent SRS transmission for the UE by higher layer signaling. The eNB may instruct the UE to activate the SRS resource set by MAC CE signaling, and the UE may transmit an SRS resource referred to in the activated SRS resource set. The SRS resource set activated by the MAC CE signaling may be limited to an SRS resource set for which resourceType is set to semi-persistent. Time-frequency domain resource mapping in a slot in which the SRS resource is to be transmitted is based on resource mapping information configured for the SRS resource, and slot mapping including a transmission periodicity and a slot offset is based on periodicityAndOffset configured for the SRS resource. In addition, for the spatial-domain transmission filter applied to the SRS resource to be transmitted, spatialRelationInfo configured for the SRS resource or associated CSI-RS information configured for the SRS resource set including the SRS resource may be referred to. If spatialRelationInfo is configured in the SRS resource, a spatial-domain transmission filter may be determined by referring to configuration information of spatialRelationInfo transmitted by MAC CE signaling that activates semi-persistent SRS transmission without following the configured spatialRelationInfo. The UE may transmit the SRS resource in a UL BWP activated for the semi-persistent SRS resource activated by higher layer signaling.

The eNB may trigger aperiodic SRS transmission for the UE by DCI. An SRS request field in the DCI transmitted by the eNB may trigger at least one of aperiodic SRS resource sets. The UE may understand that the SRS resource set indicated by the SRS request field in the DCI in aperiodicSRS-ResourceTriggerList in the SRS resource set is triggered. The UE may transmit an SRS resource referred to in the triggered SRS resource set. Time-frequency domain resource mapping in a slot in which the SRS resource is to be transmitted is based on resource mapping information configured for the SRS resource. Further, slot mapping for the SRS resource to be transmitted may be determined based on a slot offset between the DCI including the SRS request field and an actual transmission of the SRS resource set. For this purpose, value(s) included in slotOffset configured for the SRS resource set may be referred to. Specifically, the slot offset between the DCI and the SRS resource set may be determined by applying a value indicated by the time-domain resource allocation field in the DCI among the value(s) set by slotOffset configured in the SRS resource set. Further, for a spatial-domain transmission filter applied to the SRS resource to be transmitted, spatialRelationInfo configured for the SRS resource or associated CSI-RS information configured in the SRS resource set including the SRS resource may be referred to. The UE may transmit the SRS resource in a UL BWP activated for the aperiodic SRS resource activated by higher layer signaling.

When the eNB triggers aperiodic SRS transmission to the UE by DCI, the UE may consider a minimum time interval between a PDCCH including the DCI triggering aperiodic SRS transmission and an SRS to be transmitted in order to transmit the SRS by applying configuration information for the SRS resource. The time interval for the SRS transmission of the UE may be defined as the number of symbols between the last symbol of the PDCCH including the DCI triggering aperiodic SRS transmission and the first symbol to which the first of transmitted SRS resource(s) is mapped. The minimum time interval may be determined by referring to a PUSCH preparation procedure time required for the UE to prepare for PUSCH transmission. Further, the minimum time interval may have a different value depending on the usage of the SRS resource set including the transmitted SRS resource. For example, the minimum time interval may be determined as N2 symbols which is defined in consideration of a UE processing capability based on UE capabilities with reference to the PUSCH preparation procedure time of the UE. For example, in the case where the usage of the SRS resource set including the transmitted SRS resource is considered, when the usage of the SRS resource set is set to 'codebook' or 'antennaSwitching', the minimum time interval may be determined as N2 symbols. When the usage of the SRS resource set is set to 'nonCodebook' or 'beamManagement', the minimum time interval may be set to N2+14 symbols. When the time interval for the SRS transmission is greater than or equal to the minimum time interval, the UE may transmit an aperiodic SRS, whereas when the time interval for the SRS transmission of the UE is less than the minimum time interval, the UE may ignore the DCI triggering the aperiodic SRS.

In CSI transmission, the UE may estimate a channel, calculate a precoding matrix to be used for DL, and report a PMI value set in a codebook to the eNB according to the calculated precoding matrix. For example, the UE may be configured with typeII-PortSelection by codebookType in a higher layer parameter, codebook configuration. The number of CSI-RS ports for channel estimation is configured by nrofPorts, and a value available as the number of CSI-RS ports, $P_{CSI-RS} \in \{4, 8, 12, 16, 24, 32\}$. The UE should measure a channel state, select L antenna ports per polarization from among PCSI-RS beamformed ports, and report the measured channel state, where L is configured by a higher layer parameter 'numberOfBeams', when PCSI-RS=4, L=2, and when PCSI-RS>4, L={2, 3, 4}. When an RI value is less than or equal to 2 (i.e., $v \leq 2$), a PMI reported by the UE is given as illustrated in <Table 14> below.

TABLE 14

Type II Port Selection PMI $$i_1 = \begin{cases} [i_{1,1} i_{1,3,1} i_{1,4,1}] & v = 1 \\ [i_{1,1} i_{1,3,1} i_{1,4,1} i_{1,3,2} i_{1,4,2}] & v = 2 \end{cases}$$

$$i_2 = \begin{cases} [i_{2,1,1}] \text{ subbandAmplitude} = \text{'false'}, & v = 1 \\ [i_{2,1,1} i_{2,1,2}] \text{ subbandAmplitude} = \text{'false'}, & v = 2 \\ [i_{2,1,1} i_{2,2,1}] \text{ subbandAmplitude} = \text{'true'}, & v = 1 \\ [i_{2,1,1} i_{2,2,1} i_{2,1,2} i_{2,2,2}] \text{ subbandAmplitude} = \text{'true'}, & v = 2 \end{cases}$$

Herein, v is an RI value, that is, a rank value, and each PMI value corresponds to codebook indexes i1 and i2. The UE reports a wideband PMI through i1 and a subband PMI through i2. As described above, the UE selects and reports L ports per polarization from among PCSI-RS beamformed ports. The UE reports the index of a first port among the L beamformed ports through $$i_{1,1} \in \left\{0, 1, \ldots, \left\lceil \frac{P_{CSI-RS}}{2d} \right\rceil - 1\right\},$$

and d∈ {1, 2, 3, 4} is configured by portSelectionSampling-Size. For example, if i1, l=2 and d=2, it indicates that L ports per polarization are selected, starting from the fourth of the PCSI-RS ports. To reduce PMI overhead, the UE reports the index of a port having a channel with the largest measured amplitude among 2L ports of an lth layer through i1,3,l. The amplitude of the wideband PMI is reported through i1,4,l, and the amplitude and phase of the subband PMI are reported by i2,2,l and i2,1,l, respectively. Amplitude indications i1,4,l and i2,2,l are configured by the following <Table 15> to <Table 17>.

TABLE 15

$i_{1, 4, l} = [k_{l, 0}^{(1)}, k_{l, 1}^{(1)}, \ldots, k_{l, 2L-1}^{(1)}]$
$i_{2, 2, l} = [k_{l, 0}^{(2)}, k_{l, 1}^{(2)}, \ldots, k_{l, 2L-1}^{(2)}]$
$k_{l, 0}^{(1)} \in \{0, 1, \ldots 7\}$
$k_{l, 0}^{(2)} \in \{0, 1\}$

TABLE 16

Mapping of elements of $i_{1, 4, l}$

| $k_{l, i}^{(1)}$ | $p_{l, i}^{(1)}$ |
|---|---|
| 0 | 0 |
| 1 | $\sqrt{\sqrt{1/64}\sqrt{}}$ |
| 2 | $\sqrt{\sqrt{1/32}\sqrt{}}$ |
| 3 | $\sqrt{\sqrt{1/16}\sqrt{}}$ |
| 4 | $\sqrt{\sqrt{1/8}\sqrt{}}$ |
| 5 | $\sqrt{\sqrt{1/4}\sqrt{}}$ |
| 6 | $\sqrt{\sqrt{1/2}\sqrt{}}$ |
| 7 | 1 |

TABLE 17

Mapping of elements of $i_{2, 2, l}$

| $k_{l, i}^{(2)}$ | $p_{l, i}^{(2)}$ |
|---|---|
| 0 | $\sqrt{1/2}\sqrt{}$ |
| 1 | 1 |

The phase indication of the subband PMI is configured as i2,1,l=[cl,0, cl,1, ..., cl,2L−1]. To reduce the PMI overhead, the UE does not report $k_{l,i_{1,3,l}}^{(1)}$, $k_{l,i_{1,3,l}}^{(2)}$, $c_{l,i_{1,3,l}}$, and it is configured that $k_{l,i_{1,3,l}}^{(1)}=7$, $k_{l,i_{1,3,l}}^{(2)}=1$, and $c_{l,i_{1,3,l}}=0$. If a higher layer parameter subbandAmplitud is 'false', the amplitude of the subband PMI is not reported, the amplitude of the subband PMI is set to $k_{l,i}^{(2)}=1$, the phase of a subband with zero amplitude of a wideband PMI is not reported, and the value of the phase is set to c l,0=0. If the number of amplitudes greater than 0 for the wideband PMI is Ml, a total of Ml−1 phases are reported for the wideband PMI, the values of the phases are set to cl,i∈ {0, 1, ... N PSK−1}, and NPSK-1 ∈ {4,8} may be configured by a higher layer parameter, phaseAlphabetSize.

If the higher layer parameter, subbandAmplitude is set to 'true', the amplitudes and phases of subband PMIs for min(M l,K (2))−1 strong wideband PMI ports except for an i1,3,lth port may be reported, $k_{l,i}^{(2)} \in \{0,1\}$, and cl,i∈ {0, 1, . . . NPSK−1}. K(2) may be determined by the following <Table 18>. The amplitudes of the remaining 2L-min(Ml, K(2)) subband PMIs are not reported, and $k_{l,i}^{(2)}=1$. Among the phases of subband PMIs, the phases of Ml-min(Ml,K(2)) subband PMIs are reported by setting cl,i∈ {0, 1, 2, 3}, the phases of the remaining 2L-min(Ml,K(2)) subband PMIs may not be reported, and $c_{l,0}=0$.

TABLE 18

Full resolution subband coefficients
when subbandAmplitude is set to 'true'

| L | $K^{(2)}$ |
|---|---|
| 2 | 4 |
| 3 | 4 |
| 4 | 6 |

A codebook obtained from PMIs reported by the UE is given as <Table 19> below. In <Table 19>, $\varphi_{l,i}$ is given as follows, and $v_m$ is a vector of length $P_{CSI-RS}/2$ in which an (m mod $P_{CSI-RS}/2)^{th}$ element is 1 and the remaining elements are 0.

TABLE 19

Codebook for Type II port selection

Layers $\upsilon = 1$ $\qquad W_{i_{1,1},p_1^{(1)}p_1^{(2)},i_{2,1,1}}^{(1)} = W_{i_{1,1},p_1^{(1)},p_1^{(2)},i_{2,1,1}}^1$ $\upsilon = 2$ $\qquad W_{i_{1,1},p_1^{(1)},p_1^{(2)},i_{2,1,1},p_2^{(1)},p_2^{(2)},i_{2,1,2}}^{(2)} = \frac{1}{\sqrt{2}}\left[W_{i_{1,1},p_1^{(1)}p_1^{(2)},i_{2,1,1}}^1 \quad W_{i_{1,1},p_2^{(1)},p_2^{(2)},i_{2,1,2}}^2\right]$ $$\text{where } W_{i_{1,1},p_l^{(1)}p_l^{(2)},i_{2,1,l}}^l = \frac{1}{\sqrt{\sum_{i=0}^{2L-1}(p_{l,i}^{(1)}p_{l,i}^{(2)})^2}}\begin{bmatrix}\sum_{i=0}^{L-1}v_{i_{1,l},d+i}p_{l,i}^{(1)}p_{l,i}^{(2)}\varphi_{l,i} \\ \sum_{i=0}^{L-1}v_{i_{1,l},d+i}p_{l,i+L}^{(1)}p_{l,i+L}^{(2)}\varphi_{l,i+L}\end{bmatrix}, l = 1, 2,$$

and the mappings from $i_1$ to $i_{1,1}$, $p_1^{(1)}$, and $p_2^{(1)}$ and from $i_2$ to $i_{2,1,1}$, $i_{2,1,2}$, $p_1^{(2)}$, and $p_2^{(2)}$ are as described above, including the ranges of the constituent indices of $i_1$ and $i_2$.

TABLE 19-continued

Codebook for Type II port selection

Layers $$\varphi_{l,i} = \begin{cases} e^{j2\pi c_{l,i}/N_{PSK}} & subbandAmplitude = \text{'false'} \\ e^{j2\pi c_{l,i}/N_{PSK}} & subbandAmplitude = \text{'true'}, \min\left(M_l, K^{(2)}\right) \text{ strongest coefficients (including } i_{1,3,l}) \text{ with } k_{l,i}^{(1)} > 0 \\ e^{j2\pi c_{l,i}/4} & subbandAmplitude = \text{'true'}, M_l - \min\left(M_l, K^{(2)}\right) \text{ weakest coefficients with } k_{l,i}^{(1)} > 0 \\ 1 & subbandAmplitude = \text{'true'}, 2L - M_l \text{ coefficients with } k_{l,i}^{(1)} = 0 \end{cases}$$

In another example of a PMI, the UE may be configured with typeII-PortSelection-r16 by codebookType in a higher layer parameter, codebook configuration. While the above-described typeII-PortSelection is used to compress a codebook in a beam domain, typeII-PortSelection-r16 may be used to compress and report subband PMIs in the frequency domain. $P_{CSI-RS}$ is configured as described above, and d is configured by a higher layer parameter, portSelectionSamplingSize-r16. The values of the number L of ports to be selected, and parameters β and $p_v$ for a compression ratio of subband PMIs are configured by paramCombination-r16 and given as <Table 20> below. Herein, v is an RI value.

TABLE 20

Codebook parameter configurations for L, β, and $p_v$

| paramCombination-r16 | L | $\upsilon \in \{1, 2\}$ | $\upsilon \in \{3, 4\}$ | β |
|---|---|---|---|---|
| | | $p_\upsilon$ | $p_\upsilon$ | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

The PMI reported by the UE is shown in <Table 21> below.

TABLE 21

Enhanced Type II Port Selection PMI $$i_1 = \begin{cases} [i_{1,1} i_{1,5} i_{1,6,1} i_{1,7,1} i_{1,8,1}] & v = 1 \\ [i_{1,1} i_{1,5} i_{1,6,1} i_{1,7,1} i_{1,8,1} i_{1,6,2} i_{1,7,2} i_{1,8,2}] & v = 2 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3}] & v = 3 \\ [i_{1,1} i_{1,5} i_{1,6,1} i_{1,7,1} i_{1,8,1} i_{1,6,2} i_{1,7,2} i_{1,8,2} i_{1,6,3} i_{1,7,3} i_{1,8,3} i_{1,6,4} i_{1,7,4} i_{1,8,4}] & v = 4 \end{cases}$$

$$i_2 = \begin{cases} [i_{2,3,1} i_{2,4,1} i_{2,5,1}] & v = 1 \\ [i_{2,3,1} i_{2,4,1} i_{2,5,1} i_{2,3,2} i_{2,4,2} i_{2,5,2}] & v = 2 \\ [i_{2,3,1} i_{2,4,1} i_{2,5,1} i_{2,3,2} i_{2,4,2} i_{2,5,2} i_{2,3,3} i_{2,4,3} i_{2,5,3}] & v = 3 \\ [i_{2,3,1} i_{2,4,1} i_{2,5,1} i_{2,3,2} i_{2,4,2} i_{2,5,2} i_{2,3,3} i_{2,4,3} i_{2,5,3} i_{2,3,4} i_{2,2,1} i_{2,4,4} i_{2,5,4}] & v = 4 \end{cases}$$

The UE reports a wideband PMI and a basis for frequency-domain compression through i1, and reports a compressed subband PMI through i2. As mentioned above, the UE selects and reports L antenna ports per polarization among PCSI-RS beamformed ports. The UE reports the index of the first of L beamformed ports through $$i_{1,1} \in \left\{0, 1, \ldots, \left\lceil \frac{P_{CSI-RS}}{2d} \right\rceil - 1\right\},$$

and d∈ {1, 2, 3, 4} is configured by portSelectionSamplingSize-16. For example, when i1,1=2 and d=2, it indicates that L ports per polarization are selected, starting from the fourth of the PCSI-RS ports. When the codebook configuration is given as typeII-PortSelection, the UE reports a subband PMI for each subband, whereas when the codebook configuration is given as typeII-PortSelection-r16, the UE simultaneously reports subband PMIs by compressing the subband PMIs in the frequency domain, using the rows of a DFT matrix as bases to reduce PMI overhead. A maximum of R precoding matrices per subband may be applied, and R is configured by numberOfPMISubbandsPerCQISubband and has a value of 1 or 2. When the number of subbands is NSB, the total number of precoding matrices is N3=RNSB, and the size of the DFT matrix for frequency-domain compression is N3×N3. After a DFT matrix is applied to N3 matrices, the number of non-zero elements with valid values is $$M_v = \left\lceil p_v \frac{N_3}{R} \right\rceil \ll N_3,$$

which becomes the number of frequency domain (FD) bases. The number Mv of FD bases and the number of each basis among N3 bases may be reported as i1,5 and i1,6,1, which may be configured as <Table 22> below.

TABLE 22

$$i_{1,5} \in \{0, 1, \ldots, 2M_v - 1\}$$

$$i_{1,6,l} \in \begin{cases} \left\{0, 1, \ldots, \binom{N_3 - 1}{M_v - 1} - 1\right\} & N_3 \le 19 \\ \left\{0, 1, \ldots, \binom{2M_v - 1}{M_v - 1} - 1\right\} & N_3 > 19 \end{cases}$$

Once the FD bases are determined, the UE reports a bitmap indicating non-zero elements among a total of $M_v \times 2L$ elements by $i_{1,7,l}$, which may be configured as <Table 23> below.

TABLE 23

$i_{1, 7, l} = [k_{l, 0}^{(3)} \ldots k_{l, M_v - 1}^{(3)}]$
$k_{l, f}^{(3)} = [k_{l, 0, f}^{(3)} \ldots k_{l, 2L-1, f}^{(3)}]$
$k_{l, i, f}^{(3)} \in \{0, 1\}$ The maximum number of non-zero elements per layer is set to $K_D = \lceil \beta 2LM_1 \rceil$, and the total number of non-zero elements is set to $2K_0$. The UE reports the size of a wideband precoding matrix per polarization by $i_{2,3,l}$, and the amplitudes of compressed subbands by $i_{2,4,l}$, and these PMI values are configured as illustrated in <Table 24> to <Table 26> below. Further, a phase indication for subband PMIs is configured as illustrated in <Table 27> below.

TABLE 24

$i_{2,3,l} = [k_{l,0}^{(1)} \ k_{l,1}^{(1)}]$
$i_{2,4,l} = [k_{l,0}^{(2)} \ldots k_{l,M_v-1}^{(2)}]$
$k_{l,f}^{(2)} = [k_{l,0,f}^{(2)} \ldots k_{l,2L-1,f}^{(2)}]$
$k_{l,p}^{(1)} \in \{0, \ldots, 15\}$
$k_{l,i,f}^{(2)} \in \{0, \ldots, 7\}$

TABLE 25

Mapping of elements of $i_{2,3,l}$

| $k_{l,p}^{(1)}$ | $p_{l,p}^{(1)}$ | $k_{l,p}^{(1)}$ | $p_{l,p}^{(1)}$ | $k_{l,p}^{(1)}$ | $p_{l,p}^{(1)}$ | $k_{l,p}^{(1)}$ | $p_{l,p}^{(1)}$ |
|---|---|---|---|---|---|---|---|
| 0 | Reserved | 4 | $(1/2048)^{1/4}$ | 8 | $(1/128)^{1/4}$ | 12 | $(1/8)^{1/4}$ |
| 1 | $1/\sqrt{128}$ | 5 | $1/2\sqrt{8}$ | 9 | $1/\sqrt{8}$ | 13 | $1/\sqrt{2}$ |
| 2 | $(1/8192)^{1/4}$ | 6 | $(1/512)^{1/4}$ | 10 | $(1/32)^{1/4}$ | 14 | $(1/2)^{1/4}$ |
| 3 | 1/8 | 7 | 1/4 | 11 | 1/2 | 15 | 1 |

TABLE 26

Mapping of elements of $i_{2,4,l}$

| $k_{l,i,f}^{(2)}$ | $p_{l,i,f}^{(2)}$ |
|---|---|
| 0 | $1/8\sqrt{2}$ |
| 1 | $1/8$ |
| 2 | $1/4\sqrt{2}$ |
| 3 | $1/4$ |
| 4 | $1/2\sqrt{2}$ |
| 5 | $1/2$ |
| 6 | $1/\sqrt{2}$ |
| 7 | 1 |

TABLE 27

$i_{2,5,l} = [c_{l,0}, c_{l,1}, \ldots, c_{l,M_v-1}]$
$c_{l,f} = [c_{l,0,f} \ldots c_{l,2L-1,f}]$
$c_{l,i,f} \in \{0, \ldots, 15\}$ To reduce feedback overhead, the UE may report information about a port having the largest value in $i_{2,4,l}$ by $i_{1,8,l}$. A codebook obtained from PMIs reported by the UE is given as <Table 28> below. In <Table 28>, $v_m$ is a vector of length $P_{CSI-RS}/2$ in which an (m mod length $P_{CSI-RS}/2)^{th}$ element is 1 and the remaining elements are 0. $n_{3,l}^{(f)}$ in $y_{t,l}^{(f)}$ is the index of an FD basis reported by $i_{1,5}$ and $i_{1,6,l}$.

TABLE 28

Codebook for Enhanced Type II port selection

Layers $\upsilon = 1$ $$W^{(1)}_{i_{1,1},n_{3,1},p_1^{(1)},p_1^{(2)},i_{2,5,1},t} = W^1_{i_{1,1},n_{3,1},p_1^{(1)},p_1^{(2)},i_{2,5,1},t}$$

$\upsilon = 2$ $$W^{(2)}_{i_{1,1},n_{3,1},p_1^{(1)},p_1^{(2)},i_{2,5,1},n_{3,2},p_2^{(1)},p_2^{(2)},i_{2,5,2},t} = \frac{1}{\sqrt{2}}\left[W^1_{i_{1,1},n_{3,1},p_1^{(1)},p_1^{(2)},i_{2,5,1},t} \quad W^2_{i_{1,1},n_{3,2},p_2^{(1)},p_2^{(2)},i_{2,5,2},t}\right]$$

$\upsilon = 3$ $$W^{(3)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},t} = \frac{1}{\sqrt{3}}\left[W^1_{i_{1,1},n_{3,1},p_1^{(1)},p_1^{(2)},i_{2,5,1},t} \quad W^2_{i_{1,1},n_{3,2},p_2^{(1)},p_2^{(2)},i_{2,5,2},t} \quad W^3_{i_{1,1},n_{3,3},p_3^{(1)},p_3^{(2)},i_{2,5,3},t}\right]$$

$\upsilon = 4$ $$W^{(4)}_{i_{1,1},n_{3,1},p_1^{(1)},p_1^{(2)},i_{2,5,1},n_{3,2},p_2^{(1)},p_2^{(2)},i_{2,5,2},n_{3,3},p_3^{(1)},p_3^{(2)},i_{2,5,3},n_{3,4},p_4^{(1)},p_4^{(2)},i_{2,5,4},t} = \frac{1}{2}\left[W^1_{i_{1,1},n_{3,1},p_1^{(1)},p_1^{(2)},i_{2,5,1},t} \quad W^2_{i_{1,1},n_{3,2},p_2^{(1)},p_2^{(2)},i_{2,5,2},t} \quad W^3_{i_{1,1},n_{3,3},p_3^{(1)},p_3^{(2)},i_{2,5,3},t} \quad W^4_{i_{1,1},n_{3,4},p_4^{(1)},p_4^{(2)},i_{2,5,4},t}\right]$$

Where $W^l_{i_{1,1},n_3,p_l^{(1)},p_l^{(2)},i_{2,5,l},t} = \frac{1}{\sqrt{N_1 N_2 \gamma_{t,l}}}\left[\begin{array}{c}\sum_{i=0}^{L-1} v_{i_{1,1}d+1} p_{l,0}^{(1)} \sum_{f=0}^{M_v-1} y_{t,l}^{(f)} p_{l,i,f}^{(2)} \varphi_{l,i,f} \\ \sum_{i=0}^{L-1} v_{i_{1,1}d+1} p_{l,1}^{(1)} \sum_{f=0}^{M_v-1} y_{t,l}^{(f)} p_{l,i,f}^{(2)} \varphi_{l,i,f+L,f}\end{array}\right]$, $l = 1, 2, 3, 4$, $$y_{t,l} = \sum_{i=0}^{2L-1}\left(p_{l,\lfloor\frac{i}{L}\rfloor}^{(1)}\right)^2 \left|\sum_{f=0}^{M_v-1} y_{t,l}^{(f)} p_{l,i,f}^{(2)} \varphi_{l,i,f}\right|^2$$

and the mappings from $i_1$ to $i_{1,1}$, $n_{3,1}$, $n_{3,2}$, $n_{3,3}$, $n_{3,4}$, $p_1^{(1)}$, $p_2^{(1)}$, $p_3^{(1)}$ and $p_4^{(1)}$, and from $i_2$ to $i_{2,5,1}$, $i_{2,5,2}$, $i_{2,5,3}$, $i_{2,5,4}$, $p_1^{(2)}$, $p_2^{(2)}$, $p_3^{(2)}$ and $p_4^{(2)}$ are as described above, including the ranges of the constituent indices of $i_1$ and $i_2$.

$$\varphi_{l,i,f} = e^{j\frac{2\pi c_{l,i,f}}{16}}$$

$$y_{t,l} = \left[y_{t,l}^{(0)} \ y_{t,l}^{(1)} \ \ldots \ y_{t,l}^{(M_v-1)}\right]$$

$$t = \{0, 1, \ldots, N_3\}$$

TABLE 28-continued

Codebook for Enhanced Type II port selection

Layers $$y_{t,l}^{(f)} = e^{j\frac{2\pi m_{3,l}^{(f)}}{N_3}}$$

The disclosure provides embodiments in which when an eNB estimates part of a DL channel state based on an SRS in frequency division duplex (FDD), a UE measures a channel state and reports CSI. As described above, CSI includes information related to an angle, a delay, an amplitude, and a phase. The channel state has reciprocity between UL and DL within a coherence time. Time division duplex (TDD) is based on the assumption that there is reciprocity between UL and DL in all of the direction, delay, amplitude, and phase of a channel, whereas FDD is based on the assumption that there is reciprocity between UL and DL in terms of an angle and a delay. In TDD, the channel state of a beam for a DL channel is calculated by estimating the channel state through an SRS based on the reciprocity. However, the reciprocity is not fully applied in FDD. Therefore, in FDD, the UE calculates the channel state of a beam in a CSI-RS and reports a PMI so that the eNB determines a beam for a DL channel.

However, because the eNB may estimate an angle and a delay from the SRS, relying on the reciprocity between UL and DL in FDD, the UE may reduce the amount of information about the angle and delay of the DL channel or may not report the angle and delay of the DL channel. That is, in view of the reciprocity between UL and DL in terms of an angle and a delay, there exists reciprocity between a beamforming direction estimated from the SRS by the BS and a beamforming direction estimated from the CSI-RS by the UE.

In the disclosure, when the eNB is capable of estimating the angle and the delay from the SRS, a codebook used for CSI reporting by the UE is defined as a reciprocity-based codebook. The codebook of the disclosure is related to a PMI reported to the eNB by the UE. The use of a reciprocity-based codebook may offer the following benefits.

The UE may not estimate a beamforming direction from the CSI-RS.

DL overhead may be reduced by reducing the number of CSI-RS ports transmitted by the eNB.

The UE may reduce the overhead of channel state reporting by not reporting a PMI for a beamforming direction or reducing the amount of information of the PMI.

Compared to a Type II port selection PMI and an Enhanced Type II port selection PMI, the quantization level of the amplitude and phase of a channel may be improved with the same amount of PMI overhead.

Figure 10:
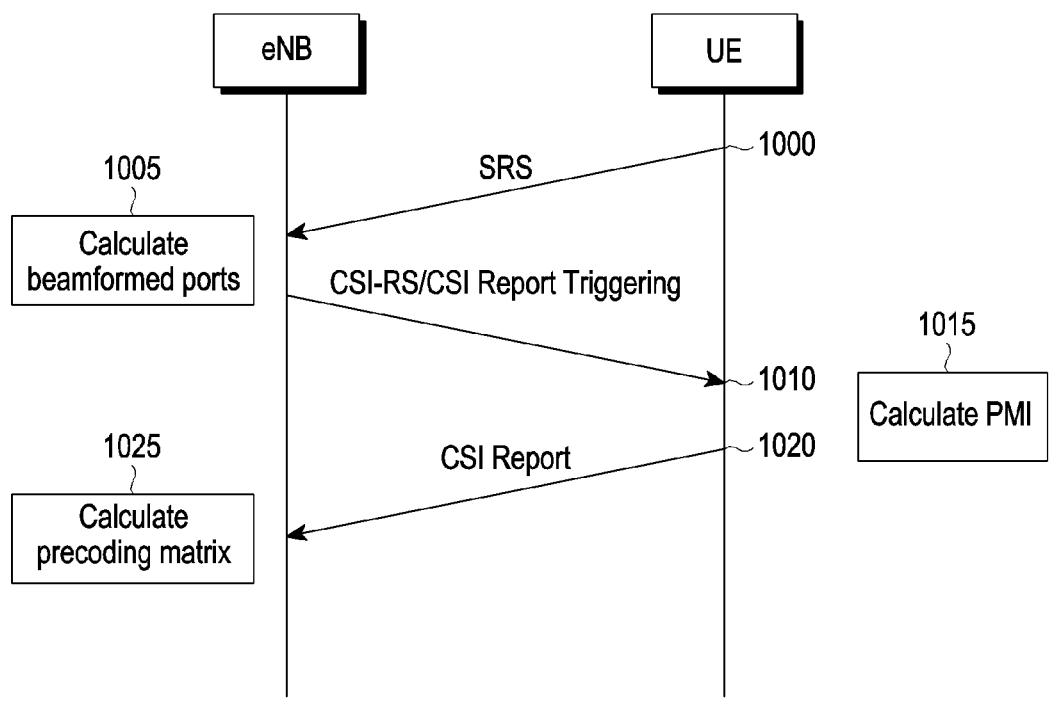
FIG. 10 is a diagram illustrating a signal flow for a channel state measurement and reporting procedure of a user equipment (UE) according to an embodiment of the disclosure.

FIG. 10 is a diagram illustrating a signal flow for a channel state measurement and reporting procedure of a UE according to an embodiment of the disclosure.

Referring to FIG. 10, the UE transmits an SRS in operation 1000. In operation 1005, the eNB measures a UL channel state based on the SRS, and determines at least one DL beam candidate for use on DL according to an angle and a delay based on the measured channel state. To determine the amplitude and phase of the DL beam candidate, the eNB may transmit a CSI-RS to the UE, using a beamformed port (i.e., a CSI-RS port) by reflecting the DL beam candidate in operation 1010. Simultaneously with or before the transmission of the CSI-RS, the eNB may trigger CSI reporting. In operation 1015, the UE may receive the CSI-RS in consideration of configuration information for channel state measurement and reporting, received in advance from the eNB, and generate CSI in which the DL beam candidate is reflected, using the received CSI-RS. The CSI may include at least a PMI including the amplitude and phase of the channel in which the DL beam candidate is reflected, which is generated based on a reciprocity-based codebook. In operation 1020, the UE may report the CSI including the PMI to the eNB. In operation 1025, the eNB may calculate a precoding matrix to be applied to the DL based on the PMI.

In this case, the following issues may occur from the viewpoint of operations of the eNB and the UE.

Issue 1: Since the UE is allowed not to report the index of a beamformed CSI-RS port or to report a PMI having a small amount of overhead, a method of receiving an SRS by the eNB and a method of transmitting a CSI-RS by the eNB may vary according to purposes. Accordingly, configuration information for channel measurement and reporting of the UE may vary under circumstances.

Issue 2: Regarding an existing codebook, the eNB may determine the number of a CSI-RS port from which a channel is to be measured and reported by the UE. Regarding a reciprocity-based codebook, the eNB may configure the number of a CSI-RS port for which CSI is to be reported. Therefore, a method of configuring the number of a CSI-RS port for use in channel measurement and reporting of the UE may vary under circumstances.

Issue 3: Compared to the existing codebook, PMI overhead is reduced, and thus information about the amplitude and phase of a channel may be transmitted accurately. Accordingly, various methods of configuring CSI to be reported by the UE may be available.

For the above issues, embodiments of channel state measurement and reporting of the UE in various cases will be described below in detail.

Embodiment 1: Channel Measurement and Reporting According to CSI-RS Beam Port Configuration To use a reciprocity-based codebook, the UE may measure a channel in a CSI-RS transmitted by the eNB. The eNB may determine a beamformed CSI-RS port (or referred to as a CSI-RS beam port) based on an SRS transmitted by the UE, before transmitting the CSI-RS. Configuration information that the UE receives from the eNB to measure or report a PMI may include at least one of the following parameters.

Number of beams to be reported by the PMI: the value L of 'NumberOfBeams'

Number of CSI-RS ports: the value PCSI-RS of 'nrofPorts'

Number of beam ports to be used: the number of beam candidates or CSI-RS ports selected based on the SRS, the value of 'nrofUsedPorts', 'nrofPorts-r16', or the value LCSI-RS of 'NumberOfBeams-r16'

At least one of the parameters may be configured for the UE by higher layer signaling or a MAC CE or DCI. Channel measurement and reporting operations of the UE according to various configuration methods are as follows.

Method 1: L, PCSI-RS, and LCSI-RS are configured by the eNB.

The UE determines that LCSI-RS ports are beamformed ports selected based on the SRS.

When LCSI-RS>0, the UE may perform the operation of Embodiment 1-1 to be described later.

When LCSI-RS=PCSI-RS, the UE may expect the value of 'NumberOfBeams' to be PCSI-RS≥L. For example, when PCSI-RS=LCSI-RS=4, a configuration that L∈{1, 2, 3, 4} may be expected.

If LCSI-RS>L, the UE ignores a value set as L, measures a channel in a CSI-RS corresponding to the LCSI-RS ports, and report the channel measurement.

If LCSI-RS=0, the UE performs an existing type II port selection codebook operation, type II codebook or enhanced type II port selection codebook operation, or enhanced type II codebook operation.

Method 2: PCSI-RS and L are configured by the eNB.

When the UE is instructed to report a reciprocity-based codebook, the UE determines that PCSI-RS ports are beamformed ports selected based on the SRS.

It may be expected that the value of 'NumberOfBeams' is equal to or less than PCSI-RS. For example, when PCSI-RS=LCSI-RS=4, a configuration that L∈{1, 2, 3, 4} may be expected.

When PCSI-RS=L, the UE may perform the operation of Embodiment 1-1.

When PCSI-RS>L, the UE may perform the operation of Embodiment 1-2.

Method 3: PCSI-RS and LCSI-RS are configured by the eNB.

When L is not configured by 'NumberOfBeams' but given in 'paramCombination-r16', the UE determines that LCSI-RS ports are beamformed ports selected based on the SRS.

In a table configured by 'paramCombination-r16', the rows of selectable combinations of β and pv for any LCSI-RS and PCSI-RS are all possible. For example, for PCSI-RS=4, a configuration that 'paramCombination-r16'∈{0, 1, . . . 7} may be expected.

In 'paramCombination-r16', L may not be used, and it is expected that L=LCSI-RS.

The UE may expect the operation of Embodiment 1-1.

Method 1 and Method 2 described above are applicable to a PMI based on Type II port selection of <Table 14>, whereas when a configuration such as L=3 is needed in applying Method 1 and Method 2 to a PMI based on Enhanced Type II port selection of <Table 21>, the table (e.g., <Table 20>) configured by 'paramCombination-r16' should be made very large or 'NumberOfBeams' should be separately configured redundantly. In Method 3, the operation of Embodiment 1-1 at the UE may be expected by only configuring LCSI-RS without making the table configured by 'paramCombination-r16' large or configuring 'NumberOfBeams' separately. The above-mentioned embodiments 1-1 and 1-2 will be described below in detail.

When Method 1 and Method 2 described above are applied to a PMI based on Enhanced Type II port selection of <Table 19>, it may be assumed that reciprocity is established between frequency-domain bases of compressed subbands in some cases. Accordingly, in some cases, the eNB may measure the frequency domain bases based on the SRS and inform the UE of the measurements by a higher layer configuration or a MAC CE or DCI, or may instruct the UE not to report the measurements.

A method of selecting a beam candidate group for a DL channel based on reciprocity may have two stages. In the disclosure, the two stages are defined as follows. In the first stage, the eNB selects a beam candidate group by measuring the angle and delay of a channel based on an SRS transmitted by the UE. In the second stage, the UE selects a beam candidate group by measuring the angle and delay of a channel based on a CSI-RS transmitted by the eNB.

Configuration information that the UE receives from the eNB to measure and report a channel state may include 'reportQuantity'. 'reportQuantity' may include at least one of the following parameters configured for the UE by the eNB.

None
cri-RI-PMI-CQI
cri-RI-LI-PMI-CQI
cri-RI-i1
cri-RI-i1-CQI
cri-RI-CQI
cri-RSRP
cri-RI-RSRP
ssb-Index-RSRP
cri-SINR-r16
ssb-Index-SINR-r16
cri-RI-i2-r17
cri-RI-i2-CQI-r17
cri-RI-pPMI-CQI-r17
cri-RI-pPMI-r17

In an embodiment of the disclosure, when the UE is configured with 'cri-RI-i2-r17' or 'cri-RI-i2-CQI-r17' by 'reportQuantity', the UE may include only i2 without i1 in a reported PMI.

Configuration information that the UE receives from the eNB to measure and report a channel state may also include 'codebookConfig'. The UE may be configured with a codebook type to be used for PMI reporting by 'codebookConfig'. The following codebooks are configurable by 'codebookConfig', and at least one of the following codebooks may or may not be configured.

typeI-SinglePanel: Type I single-panel codebook
typeI-MultiPanel: Type I multi-panel codebook
typeII: Type II codebook
typeII-PortSelection: Type II port selection codebook (<Table 19>)
typeII-r16: enhanced Type II codebook
typeII-PortSelection-r16: enhanced Type II port selection codebook (<Table 28>)
typeII-SRS-PortSelection-r17: Reciprocity-based Type II port selection codebook In an embodiment of the disclosure, 'typeII-SRS-PortSelection-r17' is one of reciprocity-based codebooks for PMI reporting, and the afore-described various codebooks may also be available as reciprocity-based codebooks for PMI reporting according to configurations. Beam candidate group selection and a PMI reporting method of a UE according to cases will be described in detail in Embodiment 1-1 and embodiment 1-2.

Embodiment 1-1: Single Stage Reciprocity-Based PMI Reporting

In an exemplary method of selecting a beam candidate group for a DL channel, only the first stage may be performed. A beam candidate group selected in the first stage becomes beam ports to be used on DL. Therefore, the UE may not measure or report the number of a beam port to be used among beamformed CSI-RS ports. To report a PMI, the UE may be configured with the number of a port corresponding to a PMI to be reported among the received CSI-RS ports by 'PortIndication', and configuration methods for various cases will be described in detail in Embodiment 2.

The UE may be configured with, for example, one of 'cri-RI-PMI-CQI', 'cri-RI-LI-PMI-CQI', 'cri-RI-i2-r17', 'cri-RI-i2-CQI-r17', 'cri-RI-pPMI-CQI-r17', and 'cri-RI-pPMI-r17' by 'reportQuantity' for reciprocity-based PMI reporting, and with, for example, one of 'typeII-PortSelection', 'typeII-PortSelection-r16', and 'typeII-SRS-PortSelection-r17' by 'codebookConfig'. In some cases, 'typeII' or 'typeII-r16' may also be configured by 'codebookConfig'.

Figure 11:
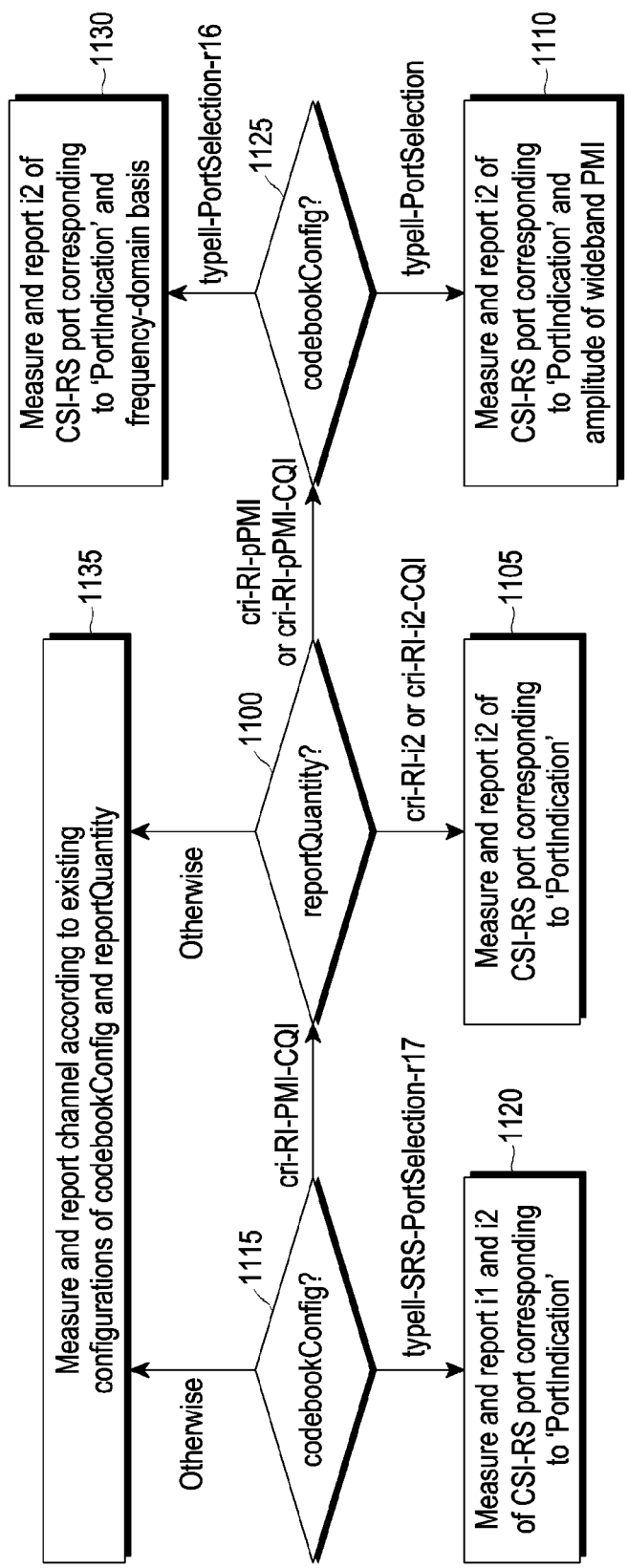
FIG. 11 is a diagram illustrating an operation of reciprocity-based channel measurement and precoding matrix index (PMI) reporting based on a higher layer parameter configuration according to an embodiment of the disclosure.

FIG. 11 is a diagram illustrating a reciprocity-based channel measurement and PMI reporting operation according to a higher layer parameter configuration according to an embodiment of the disclosure. As illustrated, reciprocity-based PMI reporting may be performed as follows according to the configurations of 'reportQuantity' and 'codebookConfig'.

Referring to FIG. 11, when the UE is configured with 'cri-RI-i2-r17' or 'cri-RI-i2-CQI-r17' by 'reportQuantity' in operation 1100, the UE does not report 'i1' in a configured codebook, generates i2' by measuring a subband PMI or a compressed subband PMI for a CSI-RS port corresponding to 'PortIndication', and reports 'i2' as a PMI. For example, when 'typeII-PortSelection-r16' is configured, the UE may omit an indication indicating the number of a selected port included in 'i1' and a bitmap of frequency domain bases and non-zero elements in a PMI report.

When the UE is configured with 'cri-RI-pPMI-CQI-r17' or 'cri-RI-pPMI-r17' by 'reportQuantity' in operation 1100, the UE identifies a configured codebook, that is, 'codebookConfig' in operation 1125. Reduced 'i1' including only part of 'i1' and 'i2' may be generated through the configured codebook. In operation 1125, when 'typeII-PortSelection' is configured in 'codebookConfig', the UE may generate the reduced 'i1', for example, by not including an indication indicating the number of the selected port, that is, i1,1 and i1,3,1 in 'i1' as illustrated in <Table 29>. The UE may generate 'i2' by measuring a subband PMI for a CSI-RS port corresponding to 'PortIndication', generate the reduced 'i1' by measuring the amplitude of a wideband PMI, and report the reduced 'i1' and 'i2' as a PMI to the eNB. In this case, a precoding matrix in the codebook of <Table 19> may be used, and vm may be omitted in the PMI report because the eNB is capable of calculating $v_m$ through an SRS.

When the UE is configured with 'typeII-PortSelection-r16' by the configured codebook in operation 1125, the UE may generate reduced 'i1', for example, by omitting i1,1 and i1,8,1 in 'i1' as illustrated in <Table 30> in operation 1130. That is, the UE generates 'i2' by measuring the compressed subband PMI of the CSI-RS port corresponding to 'PortIndication', generates the reduced 'i1' by measuring an FD basis, and reports the reduced 'i1' and 'i2' as a PMI. In this case, a precoding matrix in the codebook of <Table 28> may be used, and vm may be omitted in the PMI report because the eNB is capable of calculating $v_m$ through an SRS.

TABLE 29

Reciprocity-based Type II port selection codebook PMI $$i_1 = \begin{cases} [i_{1,4,1}] & v = 1 \\ [i_{1,4,1} i_{1,4,2}] & v = 2 \end{cases}$$

$$i_2 = \begin{cases} [i_{2,1,1}] \text{ subbandAmplitude } = \text{'false'}, & v = 1 \\ [i_{2,1,1} i_{2,1,2}] \text{ subbandAmplitude } = \text{'false'}, & v = 2 \\ [i_{2,1,1} i_{2,2,1}] \text{ subbandAmplitude } = \text{'true'}, & v = 1 \\ [i_{2,1,1} i_{2,2,1} i_{2,1,2} i_{2,2,2}] \text{ subbandAmplitude } = \text{'true'}, & v = 2 \end{cases}$$

TABLE 30

Reciprocity-based Enhanced Type II port selection codebook PMI (Type A)

$$i_1 = \begin{cases} [i_{1,5} i_{1,6,1} i_{1,7,1}] & v = 1 \\ [i_{1,5} i_{1,6,1} i_{1,7,1} i_{1,6,2} i_{1,7,2}] & v = 2 \\ [i_{1,5} i_{1,6,1} i_{1,7,1} i_{1,6,2} i_{1,7,2} i_{1,6,3} i_{1,7,3}] & v = 3 \\ [i_{1,5} i_{1,6,1} i_{1,7,1} i_{1,6,2} i_{1,7,2} i_{1,6,3} i_{1,7,3} i_{1,6,4} i_{1,7,4}] & v = 4 \end{cases}$$

$$i_1 = \begin{cases} [i_{1,5} i_{1,6,1} i_{1,7,1}] & v = 1 \\ [i_{1,5} i_{1,6,1} i_{1,7,1} i_{1,6,2} i_{1,7,2}] & v = 2 \\ [i_{1,5} i_{1,6,1} i_{1,7,1} i_{1,6,2} i_{1,7,2} i_{1,6,3} i_{1,7,3}] & v = 3 \\ [i_{1,5} i_{1,6,1} i_{1,7,1} i_{1,6,2} i_{1,7,2} i_{1,6,3} i_{1,7,3} i_{1,6,4} i_{1,7,4}] & v = 4 \end{cases}$$

In another example, as illustrated in <Table 31>, the UE may omit at least one of $i_{1,5}$ or $i_{1,6,1}$ indicating an FD basis or $i_{1,7,1}$ indicating a non-zero element bitmap in the PMI report by a higher layer configuration. In this case, a precoding matrix of <Table 28> may be used, and $v_m$ and $y_{t,l}$ may be omitted in the PMI report because the eNB is capable of calculating $v_m$ and $y_{t,l}$ based on an SRS.

TABLE 31

Reciprocity-based Enhanced Type II port selection codebook PMI (Type B)

$$i_1 = \begin{cases} [i_{1,7,1}] & v = 1 \\ [i_{1,7,1} i_{1,7,2}] & v = 2 \\ [i_{1,7,1} i_{1,7,2} i_{1,7,3}] & v = 3 \\ [i_{1,7,1} i_{1,7,2} i_{1,7,3} i_{1,7,4}] & v = 4 \end{cases}$$

$$i_2 = \begin{cases} [i_{2,3,1} i_{2,4,1} i_{2,5,1}] & v = 1 \\ [i_{2,3,1} i_{2,4,1} i_{2,5,1} i_{2,3,2} i_{2,4,2} i_{2,5,2}] & v = 2 \\ [i_{2,3,1} i_{2,4,1} i_{2,5,1} i_{2,3,2} i_{2,4,2} i_{2,5,2} i_{2,3,3} i_{2,4,3} i_{2,5,3}] & v = 3 \\ [i_{2,3,1} i_{2,4,1} i_{2,5,1} i_{2,3,2} i_{2,4,2} i_{2,5,2} i_{2,3,3} i_{2,4,3} i_{2,5,3} i_{2,3,4} i_{2,4,4} i_{2,5,4}] & v = 4 \end{cases}$$

When the UE is configured with 'cri-RI-PMI-CQI' by 'reportQuantity' in operation 1100, the UE may identify a configured codebook, that is, 'codebookConfig' in operation 1115. The UE may report a precoder matrix for all bands or a precoder matrix for a subband through the configured codebook. For example, when 'typeII-SRS-PortSelection-r17' is included in 'codebookConfig' in operation 1115, the UE determines and reports a reciprocity-based precoder matrix for all bands or a subband in operation 1120. In other words, the UE measures 'i1' and 'i2' of the CSI-RS port corresponding to 'PortIndication' and report them in the PMI to the eNB. For the remaining configurations in 'reportQuantity' identified in operation 1100 and 'codebookConfig' identified in operation 1115, the UE performs a channel measurement and reporting operation based on the existing parameters of 'codebookConfig' and 'reportQuantity' in operation 1135.

Embodiment 1-2: Dual-Stage Reciprocity-Based PMI Reporting

In an exemplary method of selecting a beam candidate group for a DL channel, the second stage may be performed after the first stage is performed. A beam candidate group selected in the first stage becomes beam ports to be used on DL. For example, there are many beam candidate groups in frequency range 2 (FR2) used in the NR system. When the eNB reduces the number of beam candidates by using an SRS, the UE may select a beam port from the reduced beam candidate group. In another example, the eNB may select multiple beam candidate groups, determining that beam estimation through the SRS may not be accurate, and the UE may finally select a beam port from among the beam candidate groups through a CSI-RS.

The UE may not measure or report the number of a beam port to be used among beamformed CSI-RS ports according to a configuration from the eNB. For example, when PCSI-RS≤L, the UE may expect not to report the index of the beamformed port to be reported. In this case, a PMI reporting operation may follow the afore-mentioned Embodiment 1-1. For example, when PCSI-RS>L, the UE should select L ports from among PCSI-RS ports, and report the indexes of the selected ports, and may expect that L<PCSI-RS. For example, the UE may expect a configuration that PCSI-RS=3 and L∈{1, 2, 3}.

For reciprocity-based PMI reporting, the UE may be configured with one of 'cri-RI-PMI-CQI', 'cri-RI-LI-PMI-CQI', 'cri-RI-i1', 'cri-RI-i1-CQI', 'cri-RI-pPMI-CQI-r17', and 'cri-RI-pPMI-r17' by 'reportQuantity'. 'codebookConfig' may include, for example, one of 'typeII-PortSelection', 'typeII-PortSelection-r16', and 'typeII-SRS-PortSelection-r17', and in some cases, may further include 'typeII' or 'typeII-r16'. A reciprocity-based PMI reporting operation according to 'reportQuantity' and 'codebookConfig' will be described below.

Figure 12:
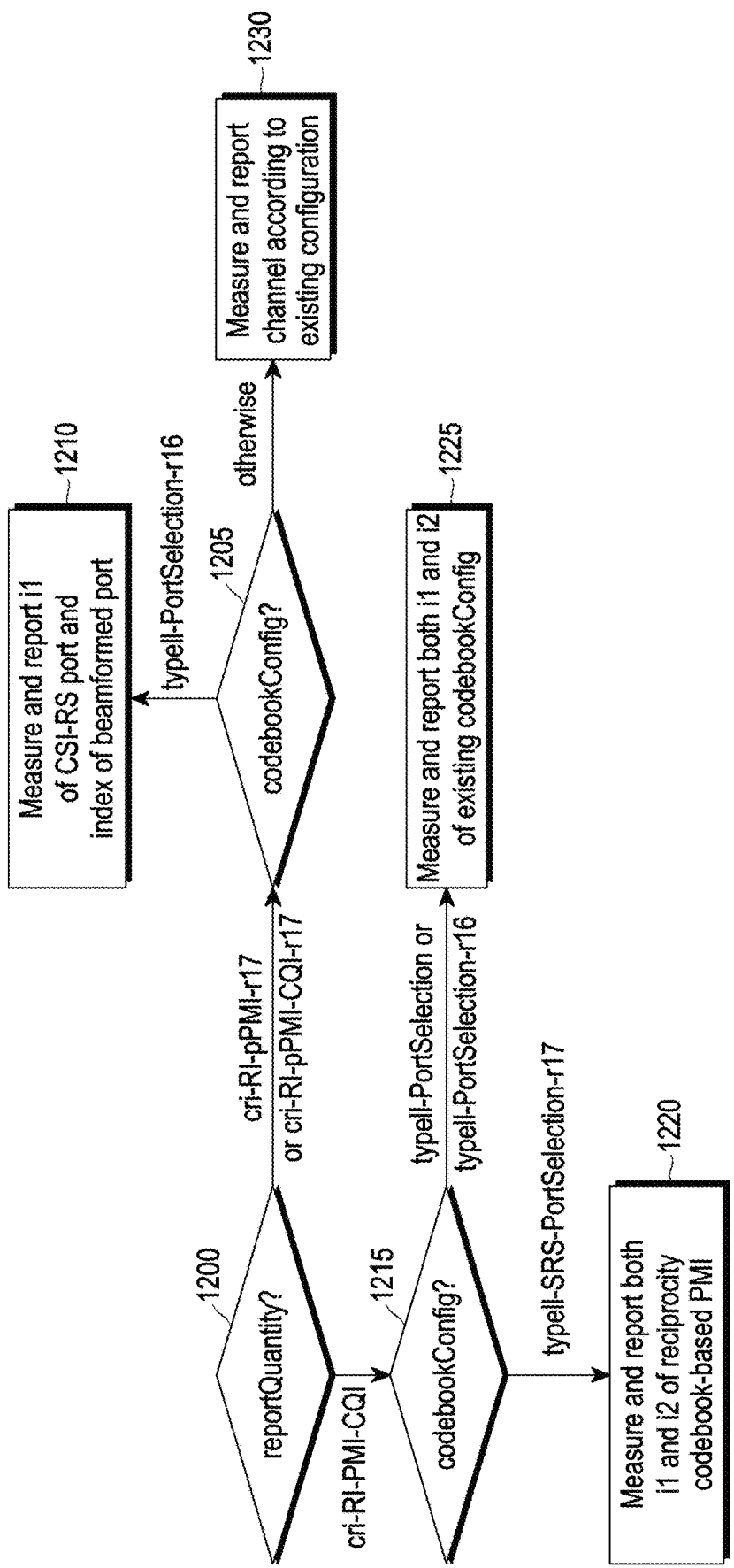
FIG. 12 is a diagram illustrating an operation of reciprocity-based channel measurement and PMI reporting based on a higher layer parameter configuration according to an embodiment of the disclosure.

FIG. 12 is a diagram illustrating a reciprocity-based channel measurement and PMI reporting operation according to a higher layer parameter configuration according to an embodiment of the disclosure.

Referring to FIG. 12, the UE identifies a parameter 'reportQuantity' received through a higher layer in operation 1200. When the UE is configured with 'cri-RI-pPMI-CQI-r17' or 'cri-RI-pPMI-r17' by 'reportQuantity', the UE may report reduced 'i1' including only part of 'i1' and 'i2' according to a configured codebook. For this purpose, the UE identifies 'codebookConfig' indicating the configured codebook in operation 1205. When 'typeII-PortSelection' is configured by the configured codebook in operation 1205, the UE may omit at least one of i1,5 or i1,6,1 indicating an FD basis or i1,7,1 indicating a non-zero element bitmap in a PMI report as illustrated in <Table 32> in operation 1210. That is, the UE generates 'i2' by measuring a subband PMI for a CSI-RS port, generates reduced 'i1' by measuring the index of a beamformed port, and reports the reduced 'i1' and 'i2' as a PMI. In this case, a precoding matrix in the codebook of <Table 28> may be used, and the eNB may calculate $y_{t,l}$ based on an SRS.

TABLE 32

Reciprocity-based Enhanced Type II port selection codebook PMI (Type C)

$$i_1 = \begin{cases} [i_{1,1}i_{1,5}i_{1,8,1}] & v = 1 \\ [i_{1,1}i_{1,5}i_{1,8,1}i_{1,8,2}] & v = 2 \\ [i_{1,1}i_{1,5}i_{1,8,1}i_{1,8,2}i_{1,8,3}] & v = 3 \\ [i_{1,1}i_{1,5}i_{1,8,1}i_{1,8,2}i_{1,8,3}i_{1,8,4}] & v = 4 \end{cases}$$

TABLE 32-continued

Reciprocity-based Enhanced Type II port selection codebook PMI (Type C)

$$i_2 = \begin{cases} [i_{2,3,1}i_{2,4,1}i_{2,5,1}] & v = 1 \\ [i_{2,3,1}i_{2,4,1}i_{2,5,1}i_{2,3,2}i_{2,4,2}i_{2,5,2}] & v = 2 \\ [i_{2,3,1}i_{2,4,1}i_{2,5,1}i_{2,3,2}i_{2,4,2}i_{2,5,2}i_{2,3,3}i_{2,4,3}i_{2,5,3}] & v = 3 \\ [i_{2,3,1}i_{2,4,1}i_{2,5,1}i_{2,3,2}i_{2,4,2}i_{2,5,2}i_{2,3,3}i_{2,4,3}i_{2,5,3}i_{2,3,4}i_{2,4,4}i_{2,5,4}] & v = 4 \end{cases}$$

When the configured codebook does not include 'typeII-PortSelection-r16' in operation 1205, the UE performs corresponding channel measurement and reporting according to parameters included in the configured codebook in operation 1230. When the UE is configured with 'cri-RI-PMI-CQI' through 'reportQuantity' in operation 1200, the UE may identify 'codebookConfig' indicating a configured codebook in operation 1215. The UE may report a precoder matrix for all bands or a precoder matrix for a subband as a PMI according to the configured codebook, that is, the configuration of 'codebookConfig' in operation 1220. For example, when the UE is configured with 'typeII-SRS-PortSelection-r17' by 'codebookConfig' in operation 1215, the UE may determine and report a precoder matrix for all bands or a subband as a PMI in operation 1220.

When the UE is configured with 'typeII-PortSelection' or 'typeII-PortSelection-r16' by 'codebookConfig' in operation 1215, the UE may perform channel measurement and reporting according to the existing type II port selection or enhanced type II port selection in operation 1225. Herein, the UE may expect that L<PCSI-RS.

Embodiment 2: Configuration of CSI-RS Beam Port Selected from SRS

This embodiment relates to configuring the UE not to report the number of a beam port in 'i1' in Embodiment 1-1. The eNB may determine a beamformed CSI-RS port based on a measurement of an SRS transmitted by the UE before transmitting a CSI-RS. To report a reciprocity-based PMI, the UE may be configured with the number of a port for which a PMI is to be reported among ports of the received CSI-RS by 'PortIndication', and configurations for various cases will be described in detail below. The UE may be configured with 'PortIndication' by higher layer signaling or a MAC CE or DCI.

Case 1: When the UE is configured with PCSI-RS and LCSI-RS and identifies that PCSI-RS=LCSI-RS, the UE may expect that CSI-RS ports are ports selected based on an SRS. The UE measures channels for all configured ports and reports the measurements as a PMI.

Case 2: 'PortIndication' includes 'startingPorts', and $$\text{'startingPorts'} \in \{0, 1, \ldots, \left\lceil \frac{P_{CSI-RS}}{21} \right\rceil - 1\}.$$

'startingPorts' indicates a first beam port reported as a PMI to which a reciprocity-based codebook is applied among PCSI-RS ports. The UE selects a total of L ports per polarization, starting from the first port configured by 'startingPorts', measures channels, and reports the measurements as the PMI. d may be configured by 'numberOfUsedPorts' or 'numberOfUsedPorts-r16'.

Case 3: Both 'startingPorts' and LCSI-RS are configured, and the UE may select a total of LCSI-RS ports per polarization, starting from a first port configured by 'startingPorts', measure channels, and report the measurements as a PMI.

Case 4: 'PortIndication' includes 'selectedPorts', which is a bitmap identifying selected ports. The number of bits of 'selectedPorts' is $$\left\lceil \frac{P_{CS1-RS}}{21} \right\rceil,$$

and the UE selects the indexes of ports set to '1' in the bitmap, measures channels, and reports the measurements as a PMI.

Case 5: When 'cri-RI-i2-r17' or 'cri-RI-i2-CQI-r17' is included in 'reportQuantity', the UE may expect that CSI-RS ports are ports selected based on an SRS. The UE may measure channels for all configured ports and report the measurements as a PMI.

In Case 1 and Case 5 described above, it may be indicated to the UE that the number of CSI-RS ports transmitted by the eNB is equal to the number of beamformed ports selected based on the SRS, and the number of CSI-RS ports may be greatly reduced. In addition, Cases 2, 3, and 4 described above have the advantage of simultaneously providing a configuration for beamformed ports selected based on an SRS and a configuration for CSI-RS ports serving various purposes. For example, CSI-RS configurations for two or more UEs may be provided by one CSI-RS port configuration. Case 2 and Case 3 described above have the advantage that the same beam selection configuration as the existing type II port selection or enhanced type II port selection is possible. Case 4 described above enables a distributed beam port configuration including a consecutive beam port configuration, thereby increasing the degree of freedom for a DL beam operation at the UE.

Embodiment 3: Subband PMI-Related Parameter Configuration

In this embodiment, when reciprocity-based PMI reporting is configured, information about a quantization level of a subband PMI may be configured by a higher layer parameter. As in the afore-mentioned Embodiment 1-1, the UE may not report 'i1' or include reduced 'i1' in which part of 'i1' is omitted in a PMI report. The UE may increase PMI information per subband or compressed subband PMI information, instead of reduction of the information amount of a wideband PMI, thereby improving PMI reporting quality.

Figure 13:
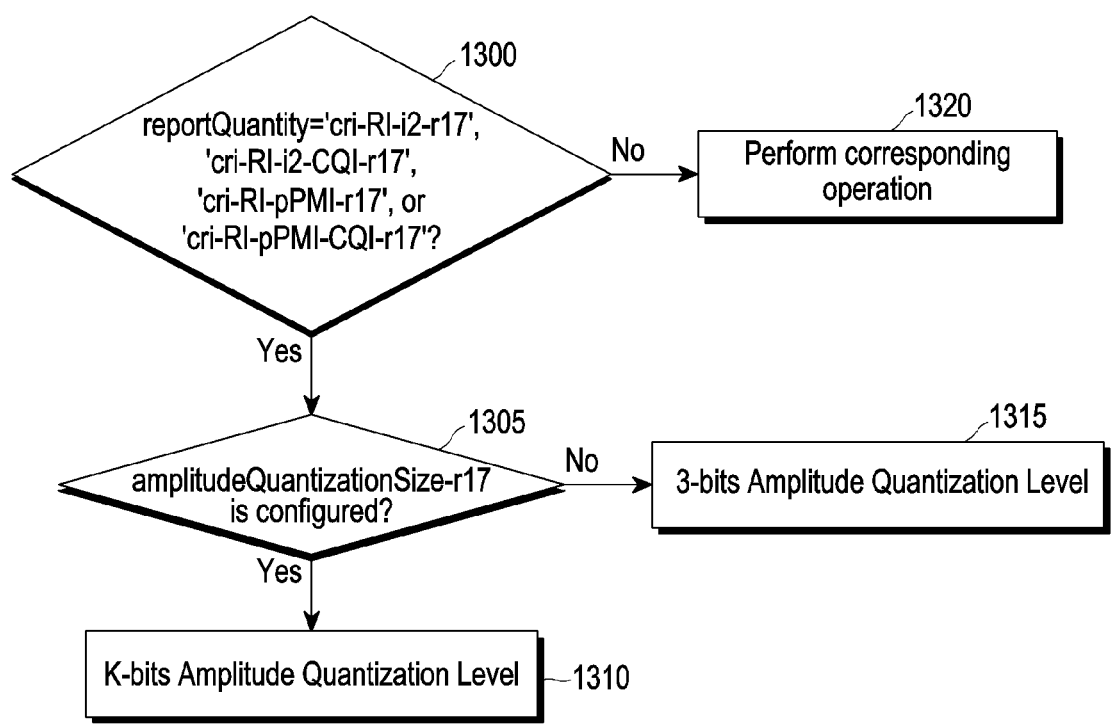
FIG. 13 is a flowchart illustrating an operation of determining the amplitude of a subband PMI according to an embodiment of the disclosure.

FIG. 13 is a flowchart illustrating an operation of determining the amplitude of a subband PMI according to an embodiment of the disclosure.

Embodiment 3-1: PMI Parameter Configuration of Type II Port Selection-Based Codebook Referring to FIG. 13, when 'reportQuantity' configured by the eNB includes one of 'cri-RI-i2-r17' 'cri-RI-i2-CQI-r17' 'cri-RI-pPMI-CQI-r17', and 'cri-RI-pPMI-r17', 'codebookConfig' includes 'typeII-PortSelection' or 'typeII-SRS-PortSelection-r17', and a PMI of a codebook based on Type II Port selection of <Table 29> described above is used in operation 1300, the UE may generate a subband PMI as follows in operation 1305. Method 1: When the UE obtains Q Amplitude∈{3, . . . , K} from 'amplitudeQuantizationSize-r17' configured by higher layer signaling, for example, 'reportQuantity' in operation 1305, the UE determines to quantize i1,4,l indicating the amplitude of a channel in a wideband PMI by a quantization level of K bits according to a value given by 'amplitudeQuantizationSize-r17' in operation 1310. The values of $i_{1,4,l} = k_{1,i}^{(1)}$ according to quantization levels are illustrated in <Table 33> below.

TABLE 33

| Mapping of elements $i_{1,4,l}$ based on amplitudeQuantizationSize-r17 | |
|---|---|
| $k_{l,i}^{(1)}$ | $p_{l,i}^{(1)}$ |
| 0 | 0 |
| $1, 2, \ldots, 2^K - 1$ | $\sqrt{\tfrac{1}{2}}\sqrt{2^{K-1-k_{l,i}^{(1)}}}$ |

Method 2: In another embodiment, the eNB may configure 'phaseAlphabetSize-r17' through a higher layer, and when the UE identifies the parameter, the UE may expect to use NPSK∈{4, 8, 12, 16} in calculating $\varphi_{1,i} = e^{j2\pi c_{1,i}/N_{PSK}}$ during channel measurement.

Method 3: In another embodiment, when 'amplitudeQuantizationSize-r17' or 'phaseAlphabetSize-r17' is not configured, or when although these parameters are configured, non use of the parameters is triggered by a MAC CE, the UE may measure and report a channel, using a parameter NPSK configured according to the value of 'phaseAlphabetSize'.

When identifying that 'amplitudeQuantizationSize-r17' is not configured in operation 1310, the UE determines to quantize a channel amplitude, using an existing fixed quantization level, for example, 3 bits in operation 1315. In the existing Type II port selection-based codebook, QAmplitude is fixed to 3, and thus a quantization level is not configurable. Although NPSK is configurable by 'phaseAlphabetSize', the maximum value of NPSK is 8. In contrast, a configuration of QAmplitude based on 'amplitudeQuantizationSize-r17' and a configuration of NPSK based on 'phaseAlphabetSize-r17' may enable improvement of the quality of PMI reporting. In addition, PMI overhead reduction may be expected by disabling 'amplitudeQuantizationSize-r17' or 'phaseAlphabetSize-r17'.

Embodiment 3-2: PMI Parameter Configuration of Enhanced Type II Port Selection-Based Codebook Referring to FIG. 13, when 'reportQuantity' configured by the eNB includes one of 'cri-RI-i2-r17', 'cri-RI-i2-CQI-r17', and 'cri-RI-pPMI-CQI-r17', 'codebookConfig' includes 'typeII-PortSelection-r16' or 'typeII-SRS-PortSelection-r17', and a PMI of the above-described <Table 30> to <Table 32> is used in operation 1300, the UE may configure a configuration for a subband PMI as follows.

Method 1: The UE may identify that R∈{16, 32} is configured by 'numberOfPMISubbandsPerCQISubband-17' received from the eNB.

Method 2: The UE identifies that QAmplitude∈{3, . . . , K} is configured by 'amplitudeQuantizationSize-r17' provided by the eNB in operation 1305, and determines to quantize a PMI value i2,4,l by a K-bit quantization level according to a value given by the 'amplitudeQuantizationSize-r17' in operation 1310. The values of $i_{2,4,l} = k_{l,i}^{(2)}$ are given according to quantization levels as illustrated in Table 34 below.

TABLE 34

Mapping of elements $i_{2, 4, 1}$ based on amplitudeQuantizationSize-r17

| $k_{l, i, f}^{(2)}$ | $p_{l, i, f}^{(2)}$ |
|---|---|
| $1, 2, \ldots, 2^K - 1$ | $(\sqrt{1/2})^{\sqrt{2^K - 1 - k_{l,i,f}^{(2)}}\,2^{3-K}}$ |

Method 3: In another embodiment, the eNB may configure 'phaseAlphabetSize-r17' through a higher layer, and when the UE identifies the parameter, the UE may expect to use NPSK∈{16,32} in calculating $\varphi_{1,i,f} = e^{j2\pi c_{1,i,f}/N_{PSK}}$ during channel measurement.

Method 4: In another embodiment, when 'numberOfPMI-SubbandsPerCQISubband-17' or 'amplitudeQuantization-Size-r17' or 'phaseAlphabetSize-r17' is not configured, or when although the parameters are configured, non-use of the parameters is triggered by a MAC CE, the UE measures and reports channels according to the number of PMI subbands per CQI subband identified by 'numberOfPMISubbandsPer-CQISubband'.

Compared to Method 1 in Embodiment 3-1 in which an amplitude close to 0 is reported more accurately, an amplitude close to 1 is reported more accurately in Method 2. Because a non zero element is not reported in a codebook based on 'typeII-PortSelection-r16', the quality of PMI reporting may be increased by more accurately reporting an amplitude close to 1 rather than an amplitude close to 0.

For the existing Enhanced type II port selection-based codebook, QAmplitude is fixed to 3 and NPSK is fixed to 16. In contrast, Method 2 and Method 3 described above may improve the quality of a PMI by configuring QAmplitude and NPSK. Method 1 described above may improve the quality of a compressed subband PMI by increasing the number of FD bases included in a reported PMI. Method 4 described above may reduce PMI overhead.

Figure 14:
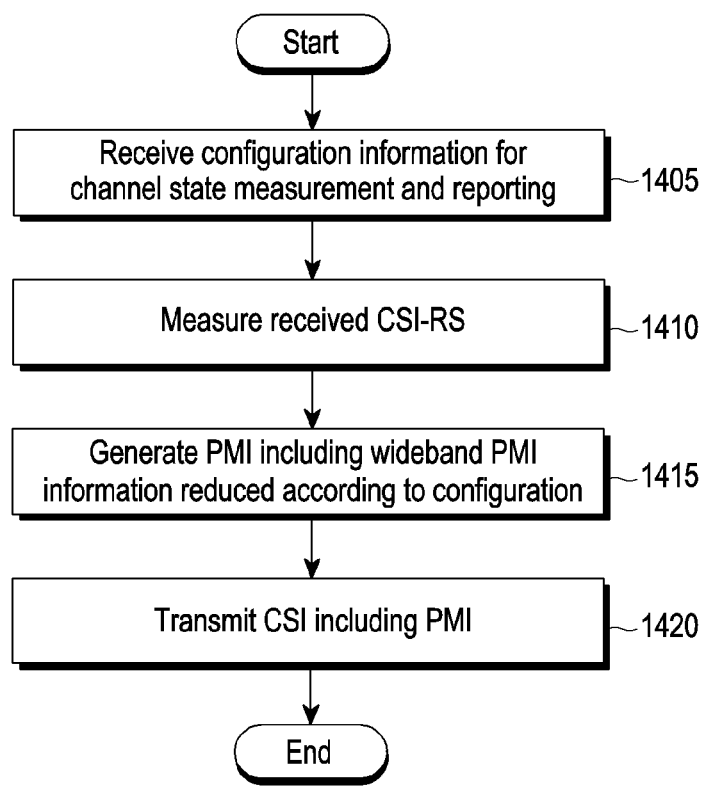
FIG. 14 is a flowchart illustrating an operation of a UE according to an embodiment of the disclosure.

FIG. 14 is a flowchart illustrating an operation of a UE according to an embodiment of the disclosure.

Referring to FIG. 14, the UE receives configuration information for channel state measurement and reporting from the eNB in operation 1405. The configuration information includes at least two of the afore-described parameters, particularly, the number L of beams to be reported by a PMI, the number PCSI-RS of CSI-RS ports, or the number LCSI-RS of beam ports to be used, 'reportQuantity', and 'codebookConfig'. The UE receives a CSI-RS in operation 1410, and generates a PMI including a (compressed) wideband PMI which includes reduced information based on the received configuration information according to at least one of the above-described embodiments in operation 1415. The PMI also includes a subband PMI, or a subband PMI including additional information according to Embodiment 3. In operation 1420, the UE reports CSI including the PMI to the eNB according to the configuration information.

Figure 15:
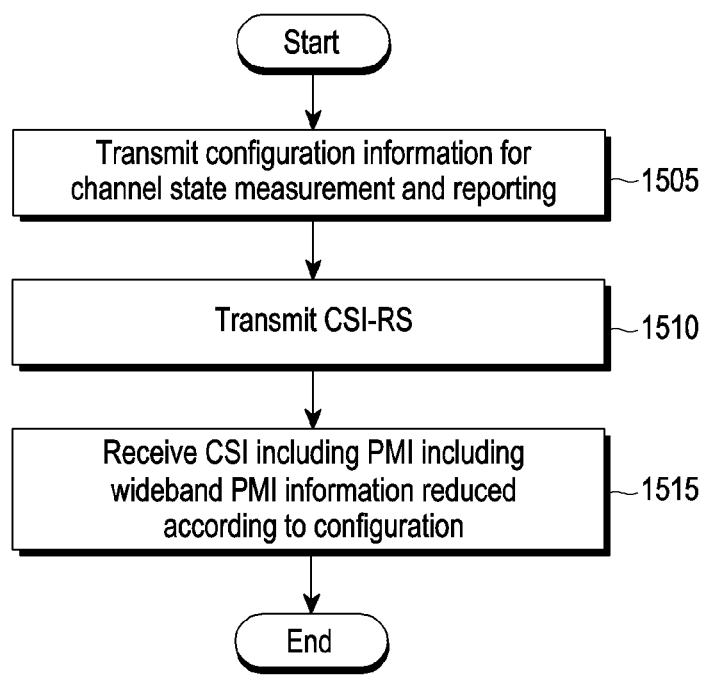
FIG. 15 is a flowchart illustrating an operation of a base station (BS) according to an embodiment of the disclosure.

FIG. 15 is a flowchart illustrating an operation of an eNB according to an embodiment of the disclosure.

Referring to FIG. 15, in operation 1505, the eNB transmits configuration information for channel state measurement and reporting to the UE in operation 1505. The configuration information includes at least two of the afore-described parameters, particularly, the number L of beams to be reported by a PMI, the number PCSI-RS of CSI-RS ports, or the number LCSI-RS of beam ports to be used, 'reportQuantity', and 'codebookConfig'. The eNB transmits a CSI-RS in operation 1510, and receives, from the UE, a PMI including a (compressed) wideband PMI which includes reduced information based on the received configuration information according to at least one of the above-described embodiments in operation 1515. The PMI also includes a subband PMI, or a subband PMI including additional information according to Embodiment 3.

According to an embodiment, a method of reporting a channel state by a UE in a wireless communication system may include receiving configuration information for channel state measurement and reporting from a BS, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, receiving at least one CSI-RS transmitted through at least one beamformed port from the BS, generating the PMI based on a measurement result of the received CSI-RS and the configuration information, and reporting CSI including the PMI to the BS.

According to an embodiment, generating the PMI may include generating first PMI information PMI_$i_1$ indicating a wideband PMI and second PMI information PMI_$i_2$ indicating a subband PMI, based on the measurement result of the CSI-RS, reducing the first PMI information not to include third information (an indicator ($v_m$) indicating the number of a port selected by the UE), frequency-domain basis information, and bitmap information of non-zero elements, and generating the PMI including the reduced first PMI information and the second PMI information. $v_m$ is a vector of length $P_{CI-RS}/2$ in which an (m mod length $P_{CSI-RS}/2)^{th}$ element is 1 and the remaining elements are 0.

According to an embodiment, the configuration information may include port indication information indicating the number of a port corresponding to the reported PMI among ports of the CSI-RS received by the UE, and the PMI may include second PMI information indicating a subband PMI or a compressed subband PMI of the CSI-RS port corresponding to the port indication information.

According to an embodiment, the configuration information may include report quantity information. When the reporting quantity information includes first information instructing reporting of second PMI information indicating a subband PMI without first PMI information indicating a wideband PMI, the PMI may include the second PMI information without the first PMI information, and when the reporting quantity information includes first information related to reduction of the first PMI information, the PMI may include reduced first PMI information in which at least part of the first PMI information is omitted, and the second PMI information.

According to an embodiment, the reduced first PMI information may include a remainder of the first PMI information, in which at least one of an indicator indicating the number of a port selected to be reported through the reduced first PMI information among the ports of the CSI-RS received by the UE, information indicating a basis for frequency-domain compression, or information indicating a bitmap of non-zero elements is omitted.

According to an embodiment, the configuration information may include codebook configuration information, and the codebook configuration information may include information indicating that a codebook used for reciprocity-based PMI reporting is configured.

According to an embodiment, a method of configuring a channel state report by a BS in a wireless communication system may include transmitting configuration information for channel state measurement and reporting to a UE, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, transmitting at least one CSI-RS through at least one beamformed port from the BS, and receiving CSI including the PMI generated based on a measurement result of the received CSI-RS and the configuration information from the UE.

According to an embodiment, the PMI may include at least one of reduced first PMI information PMI_i1 indicating a wideband PMI or second PMI information PMI_i2 indicating a subband PMI, generated based on the measurement result of the CSI-RS, and the reduced first PMI information may include a remainder of first PMI information, in which an indicator indicating the number of a port selected by the UE, frequency-domain basis information, and bitmap information of non-zero elements are not included.

According to an embodiment, the configuration information may include port indication information indicating the number of a port corresponding to the reported PMI among ports of the CSI-RS received by the UE, and the PMI may include second PMI information indicating a subband PMI or a compressed subband PMI of the CSI-RS port corresponding to the port indication information.

According to an embodiment, the configuration information may include report quantity information. When the reporting quantity information includes first information instructing reporting of second PMI information indicating a subband PMI without first PMI information indicating a wideband PMI, the PMI may include the second PMI information without the first PMI information, and when the reporting quantity information includes first information related to reduction of the first PMI information, the PMI may include reduced first PMI information in which at least part of the first PMI information is omitted, and the second PMI information.

According to an embodiment, the reduced first PMI information may include a remainder of the first PMI information, in which at least one of an indicator indicating the number of a port selected to be reported through the reduced first PMI information among the ports of the CSI-RS received by the UE, information indicating a basis for frequency-domain compression, or information indicating a bitmap of non-zero elements is omitted.

According to an embodiment, the configuration information may include codebook configuration information, and the codebook configuration information may include information indicating that a codebook used for reciprocity-based PMI reporting is configured.

Figure 16:
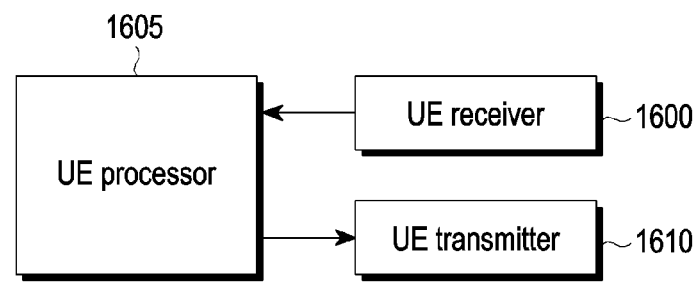
FIG. 16 is a block diagram illustrating the structure of a UE according to an embodiment of the disclosure.

FIG. 16 is a block diagram illustrating the structure of a UE according to an embodiment of the disclosure.

Referring to FIG. 16, the UE may include a transceiver 1600 and 1610 and a processor 1605 including memory. According to the afore-described communication methods of the UE, the processor 1605 of the UE may control the transceiver 1600 and 1610. However, the components of the UE are not limited to the above example. For example, the UE may include more or fewer components than the components. In addition, the transceiver 1600 and 1610 and the processor 1605 may be implemented in the form of a single chip.

The transceiver 1600 and 1610 may transmit and receive signals to and from the eNB. The signals may include control information and data. To this end, the transceiver 1600 and 1610 may include a radio frequency (RF) transmitter that up-converts and amplifies the frequency of a transmission signal, and an RF receiver that low-noise amplifies and down-converts a received signal. However, this is only an exemplary embodiment of the transceiver 1600 and 1610, and the components of the transceiver 1600 and 1610 are not limited to the RF transmitter and the RF receiver.

Further, the transceiver 1600 and 1610 may receive a signal on a radio channel, output the received signal to the processor 1605, and transmit a signal output from the processor 1605 on a radio channel.

The processor 1605 may store programs and data required for the operations of the UE. Further, the processor 1605 may store control information or data included in a signal obtained at the UE. The processor 1605 may include a storage medium such as read only memory (ROM), random access memory (RAM), hard disk, compact disk-ROM (CD-ROM), and digital versatile disk (DVD), or memory including a combination of storage media.

Further, the processor 1605 may control a series of processes so that the UE may operate according to the above-described embodiments. According to an embodiment, the processor 1605 may control the components of the UE to transmit an SRS, transmit CSI including a PMI, receive an indication and configuration information for PMI measurement and reporting, or receive a CSI-RS, and control the components of the UE to store the indication and configuration information for measurement and reporting.

Figure 17:
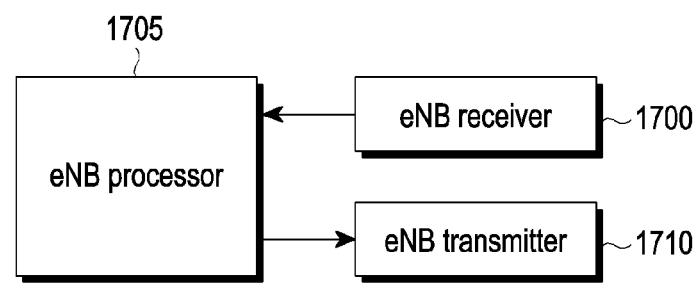
FIG. 17 is a block diagram illustrating the structure of a BS according to an embodiment of the disclosure.

FIG. 17 is a block diagram illustrating a structure of an eNB according to an embodiment of the disclosure.

Referring to FIG. 17, the eNB may include a transceiver 1700 and 1710 and a processor 1705 including memory. According to the afore-described communication methods of the eNB, the processor 1705 of the eNB may control the transceiver 1700 and 1710. However, the components of the eNB are not limited to the above example. For example, the eNB may include more or fewer components than the components. In addition, the transceiver 1700 and 1710 and the processor 1705 may be implemented in the form of a single chip.

The transceiver 1700 and 1710 may transmit and receive signals to and from the UE. The signals may include control information and data. To this end, the transceiver 1700 and 1710 may include an RF transmitter that up-converts and amplifies the frequency of a transmission signal, and an RF receiver that low-noise amplifies and down-converts a received signal. However, this is only an exemplary embodiment of the transceiver 1700 and 1710, and the components of the transceiver 1700 and 1710 are not limited to the RF transmitter and the RF receiver.

Further, the transceiver 1700 and 1710 may receive a signal on a radio channel, output the received signal to the processor 1705, and transmit a signal output from the processor 1705 on a radio channel.

The processor 1705 may store programs and data required for the operations of the eNB. Further, the processor 1705 may store control information or data included in a signal obtained at the eNB. The processor 1705 may include a storage medium such as ROM, RAM, hard disk, CD-ROM, and DVD, or memory including a combination of storage media.

Further, the processor 1705 may control a series of processes so that the eNB may operate according to the above-described embodiments. According to an embodiment, the processor 1705 may control the components of the eNB to receive an SRS, receive CSI including a PMI, transmit an indication and configuration information for PMI measurement and reporting, or transmit a CSI-RS, and control the components of the eNB to store the indication and configuration information for measurement and reporting.

According to an embodiment, an apparatus of a UE, for reporting a channel state in a wireless communication system may include the transceiver 1600 and 1610, and the processor 1605 coupled with the transceiver. The processor may be configured to receive configuration information for channel state measurement and reporting from a BS, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, receive at least one CSI-RS transmitted through at least one beamformed port from the BS, generate the PMI based on a measurement result of the received CSI-RS and the configuration information, and report CSI including the PMI to the BS.

According to an embodiment, an apparatus of a BS, for configuring a channel state report in a wireless communication system may include the transceiver 1700 and 1710, and the processor 1705 coupled with the transceiver. The processor may be configured to transmit configuration information for channel state measurement and reporting to a UE, wherein the configuration information includes at least two of a first value L indicating the number of beams to be reported through a PMI, a second value PCSI-RS indicating the number of CSI-RS ports, or a third value LCSI-RS indicating the number of beam ports to be used among the CSI-RS ports, transmit at least one CSI-RS through at least one beamformed port from the BS, and receive CSI including the PMI generated based on a measurement result of the received CSI-RS and the configuration information from the UE.

The embodiments of the disclosure disclosed in the specification and the drawings are merely presented as specific examples to easily describe the technical contents of the disclosure and help the understanding of the disclosure, not intended to limit the scope of the disclosure. That is, it will be apparent to those skilled in the art that other modification example may be implemented based on the technical spirit of the disclosure. In addition, the foregoing embodiments may be implemented in combination, when needed. For example, the embodiments of the disclosure may be combined at least partially with each other, and operated by an eNB or a UE.

In the specific embodiments of the disclosure described above, components included in the disclosure are expressed in singular or plural forms according to the specific embodiments presented. However, the singular or plural expression is appropriately selected for a situation presented for convenience of description, not limiting the disclosure. Even if a component is expressed in a plural form, it may be singular, or even a component expressed as singular may include a plurality of components.

The embodiments disclosed in the specification and drawings are only presented as specific examples to easily describe the technical contents of the disclosure, and to help the understanding of the disclosure, not intended to limit the scope of the disclosure. In addition, the embodiments according to the disclosure described above are merely illustrative, and it will be understood by those skilled in the art that various modifications and equivalent embodiments are possible therefrom. Accordingly, the true technical protection scope of the disclosure should be defined by the appended claims.

The invention claimed is:

1. A method of reporting channel state information (CSI) by a user equipment (UE) in a wireless communication system, the method comprising:
   receiving, from a base station (BS), a radio resource control (RRC) message including first information on CSI reference signal (CSI-RS) ports and second information on the number of beams,
   identifying a first value associated with the number of CSI-RS ports based on the first information, and a second value associated with the number of beams to be reported based on the second information;
   receiving at least one CSI-RS from the BS;
   generating a precoding matrix indicator (PMI) including codebook indices $i_1$ and $i_2$ based on the at least one CSI-RS, wherein the $i_1$ includes third information in case that the first value and the second value are not equal, and the $i_1$ does not include the third information in case that the first value and the second value are equal; and
   transmitting, to the BS, the CSI including the generated PMI,
   wherein the RRC message further includes port selection information; and
   wherein generating the PMI comprises: omitting, in the PMI, a codebook index $i_{1,6,1}$ related to basis information for frequency domain (FD) compression of the PMI based on the port selection information.

2. The method of claim 1, wherein the third information is determined based on the first value.

3. The method of claim 1, wherein the codebook index $i_1$ is related to a wideband PMI, and the codebook index $i_2$ is related to a subband PMI.

4. The method of claim 1, wherein the RRC message further includes port selection information; and
   wherein generating the PMI comprises: omitting, in the PMI, a codebook index $i_{1,7,1}$ indicating a non-zero element bitmap based on the port selection information.

5. A method of receiving channel state information (CSI) by a base station (BS) in a wireless communication system, the method comprising:
   transmitting, to a user equipment (UE), a radio resource control (RRC) message including first information on CSI reference signal (CSI-RS) ports and second information on the number of beams to be reported;
   identifying a first value associated with the number of CSI-RS ports based on the first information, and a second value associated with the number of beams to be reported based on the second information;
   transmitting at least one CSI-RS;
   receiving, from the UE, the CSI including a precoding matrix indicator (PMI); and
   obtaining codebook indices $i_1$ and $i_2$ included in the PMI, wherein the $i_1$ includes third information in case that the first value and the second value are not equal, and the $i_1$ does not include the third information in case that the first value and the second value are equal,
   wherein the RRC message further includes port selection information; and
   wherein obtaining the codebook indices comprises deciding that the PMI does not include a codebook index $i_{1,6,1}$ related to basis information for frequency domain (FD) compression of the PMI based on the port selection information.

6. The method of claim 5, wherein the third information is determined based on the first value.

7. The method of claim 5, wherein the codebook index in is related to a wideband PMI, and the codebook index $i_2$ is related to a subband PMI.

8. The method of claim 5, wherein the RRC message further includes port selection information; and
wherein obtaining the codebook indices comprises deciding that the PMI does not include a codebook index $i_{1,7,1}$ indicating a non-zero element bitmap based on the port selection information.

9. A user equipment (UE) comprising:
a transceiver; and
a processor coupled with the transceiver and configured to:
receive, from a base station (BS), a radio resource control (RRC) message including first information on channel state information (CSI) reference signal (CSI-RS) ports and second information on the number of beams to be reported,
identifying a first value associated with the number of CSI-RS ports based on the first information, and a second value associated with the number of beams to be reported based on the second information,
receive at least one CSI-RS from the BS,
generate a precoding matrix indicator (PMI) including codebook indices $i_1$ and $i_2$ based on the at least one CSI-RS, wherein the $i_1$ includes third information in case that the first value and the second value are not equal, and the in does not include the third information in case that the first value and the second value are equal, and
transmit, to the BS, CSI including the generated PMI,
wherein the RRC message further includes port selection information; and
wherein the processor is configured to omit, in the PMI, a codebook index $i_{1,6,1}$ related to basis information for frequency domain (FD) compression of the PMI based on the port selection information.

10. The UE of claim 9, wherein the third information is determined based on the first value.

11. The UE of claim 9, wherein the codebook index in is related to a wideband PMI, and the codebook index $i_2$ is related to a subband PMI.

12. The UE of claim 9, wherein the RRC message further includes port selection information; and
wherein the processor is configured to omit, in the PMI, a codebook index $i_{1,7,1}$ indicating a non-zero element bitmap based on the port selection information.

13. A base station (BS) comprising:
a transceiver; and
a processor coupled with the transceiver and configured to:
transmit, to a user equipment (UE), a radio resource control (RRC) message including first information on CSI reference signal (CSI-RS) ports and second information on the number of beams to be reported,
identify a first value associated with the number of CSI-RS ports based on the first information, and a second value associated with the number of beams to be reported based on the second information,
transmit at least one CSI-RS,
receive, from the UE, the CSI including a precoding matrix indicator (PMI), and
obtain codebook indices $i_1$ and $i_2$ included in the PMI, wherein the $i_1$ includes third information in case that the first value and the second value are not equal, and the $i_1$ does not include the third information in case that the first value and the second value are equal,
wherein the RRC message further includes port selection information; and
wherein the processor is configured to omit, in the PMI, a codebook index $i_{1,6,1}$ related to basis information for frequency domain (FD) compression of the PMI based on the port selection information.

14. The BS of claim 13, wherein the third information is determined based on the first value.

15. The BS of claim 13, wherein the codebook index $i_1$ is related to a wideband PMI, and the codebook index $i_2$ is related to a subband PMI.

16. The BS of claim 13, wherein the RRC message further includes port selection information; and
wherein the processor is configured to decide that the PMI does not include a codebook index $i_{1,7,1}$ indicating a non-zero element bitmap based on the port selection information.

* * * * *